US009496057B2

(12) United States Patent
Singh et al.

(10) Patent No.: US 9,496,057 B2
(45) Date of Patent: Nov. 15, 2016

(54) FAIL-SAFE CONTROL ROD DRIVE SYSTEM FOR NUCLEAR REACTOR

(71) Applicant: SMR Inventec, LLC, Marlton, NJ (US)

(72) Inventors: Krishna P. Singh, Hobe Sound, FL (US); Patrick Ingravallo, Mount Laurel, NJ (US); Leyland Vann, Carney's Point, NJ (US)

(73) Assignee: SMR INVENTEC, LLC

( * ) Notice: Subject to any disclaimer, the term of this patent is extended or adjusted under 35 U.S.C. 154(b) by 0 days.

(21) Appl. No.: 14/417,628

(22) PCT Filed: Aug. 5, 2013

(86) PCT No.: PCT/US2013/053644
§ 371 (c)(1),
(2) Date: Jan. 27, 2015

(87) PCT Pub. No.: WO2014/025700
PCT Pub. Date: Feb. 13, 2014

(65) Prior Publication Data
US 2015/0325318 A1    Nov. 12, 2015

Related U.S. Application Data

(60) Provisional application No. 61/680,133, filed on Aug. 6, 2012.

(51) Int. Cl.
*G21C 7/12* (2006.01)
*G21C 9/02* (2006.01)

(52) U.S. Cl.
CPC . *G21C 7/12* (2013.01); *G21C 9/02* (2013.01); *Y02E 30/39* (2013.01)

(58) Field of Classification Search
CPC ...... G21C 19/20; G21C 19/00; G21C 19/02; G21C 19/12; G21C 19/16
USPC ................................ 376/228, 235, 237, 239
See application file for complete search history.

(56) References Cited

U.S. PATENT DOCUMENTS 3,121,045 A    2/1964    Harris et al.
3,198,709 A    8/1965    Macomber
(Continued)

FOREIGN PATENT DOCUMENTS

WO    2012047473    4/2012

OTHER PUBLICATIONS

Corresponding International Search Report and Written Opinion for PCT/US2013/053644 dated Jan. 17, 2014.

*Primary Examiner* — Jack W Keith
*Assistant Examiner* — Lily C Garner
(74) *Attorney, Agent, or Firm* — The Belles Group, P.C.

(57) ABSTRACT

A control rod drive system (CRDS) for use in a nuclear reactor. In one embodiment, the system generally includes a drive rod mechanically coupled to a control rod drive mechanism (CRDM) operable to linearly raise and lower the drive rod along a vertical axis, a rod cluster control assembly (RCCA) comprising a plurality of control rods insertable into a nuclear fuel core, and a drive rod extension (DRE) releasably coupled at opposing ends to the drive rod and RCCA. The CRDM includes an electromagnet which operates to couple the CRDM to DRE. In the event of a power loss or SCRAM, the CRDM may be configured to remotely uncouple the RCCA from the DRE without releasing or dropping the drive rod which remains engaged with the CRDM and in position.

15 Claims, 31 Drawing Sheets

(56) References Cited

U.S. PATENT DOCUMENTS

| | | |
|---|---|---|
| 3,849,257 A | 11/1974 | Bevilacqua |
| 3,857,599 A | 12/1974 | Jones et al. |
| 4,045,283 A * | 8/1977 | Noyes ................ G21C 7/12 376/239 |
| 4,134,789 A * | 1/1979 | Aubert ................ G21C 19/10 376/233 |
| 4,573,725 A * | 3/1986 | Griffiths ................ B66C 1/66 24/603 |
| 2010/0316177 A1* | 12/2010 | Stambaugh ............ G21C 7/117 376/229 |
| 2011/0222640 A1 | 9/2011 | Desantis |
| 2011/0299648 A1 | 12/2011 | Tylman |
| 2014/0140463 A1* | 5/2014 | Walton ................ G21C 13/024 376/219 |

* cited by examiner

FAIL-SAFE CONTROL ROD DRIVE SYSTEM FOR NUCLEAR REACTOR

CROSS-REFERENCE TO RELATED PATENT APPLICATIONS

The present application claims priority as a national stage application, under 35 U.S.C. §371, to international application No. PCT/US2013/053644, filed Aug. 5, 2013, which claims the benefit of U.S. Provisional Patent Application Ser. No. 61/680,133, filed Aug. 6, 2012. The disclosures of the aforementioned priority applications are incorporated herein by reference in their entirety.

FIELD OF THE INVENTION

The present invention relates to control rod drive systems for nuclear reactors, and more particularly to a fail-safe control rod drive system.

BACKGROUND OF THE INVENTION

A rod cluster control assembly (RCCA) comprises an array of tubular elements ("control rods") containing neutron absorber "poison" connected to a common support header for raising and lowering the control rod array as a unit. The control rods in an RCCA are arrayed at a precise spacing, which ensures each rod is perfectly aligned with respective circular cavities in the fuel assemblies of the fuel core. The extent of insertion of the rod assembly into the fuel core is controlled by the device referred to as a control rod drive mechanism (CRDM), which is a subcomponent of the control rod drive system (CRDS).

In typical pressurized light water reactors (PLWRs), the CRDM is operated from the top of the reactor head which is approximately 15 to 20 feet above the top of the nuclear fuel core. However, in certain new reactor systems, the height of the reactor head may be many times greater above the top of the fuel core. For example, in the HI-SMUR™ SMR-160 from Holtec International, the RCCAs may require operation from a distance of over 60 feet, which using the present existing technology, would require the drive rod (DR) which is normally supplied with existing CRDM to be in excess of 60 feet long. DRs with such a long length, however, would be impractical for the following reasons:

Removing drive rods from the reactor vessel would require an inordinate amount of crane head room;

Performing routine maintenance would require a large laydown area;

The weight of the drive rod becomes so large due to the increased length, that during a SCRAM (emergency shutdown procedure of the reactor in which control rod are quickly inserted into the fuel core to suppress the nuclear reaction), the top nozzle of the fuel assembly risks becoming damaged from the weight of the falling RCCA as well as the ESA;

During a SCRAM, the drive rod is at risk of being damaged because of the inertia load, which is magnified in the CRDM which utilizes a lead screw for the drive rod; and Manufacture of drive rod becomes difficult thereby increasing the cost to fabricate the CRDS.

Another problem is presented by the location of the CRDM. Contemporary commercial technology requires the CRDM to be installed External to the Reactor Vessel. This presents major concerns with regards to the operational safety of the CRDS. With presently available technology should a failure of the pressure retaining portion of the CRDM occur the pressure differential between the inside of the reactor vessel and the atmosphere external to the reactor vessel would subsequently cause the CRDM drive rod to be ejected from the reactor. This in turn could cause a spike in the reactivity of the reactor core, since the drive rod is mechanically connected to the RCCA in the current state-of-the-art technology.

One solution would be to locate CRDM within the reactor vessel. However, this would pose several technical challenges. First, control rod drive mechanisms are complex electromechanical devices. Exposing these to the high pressure and temperature environment inside the reactor vessel can cause the mechanism to fail prematurely. Second, placing the control rod drive mechanism inside the reactor vessel presents possibly structural problems since the mechanism is also subject to flow induced vibration. Accordingly, although this approach would solve the long drive rod problem, it is undesirable for the foregoing reasons.

An improved control rod drive system is desired.

SUMMARY OF THE INVENTION

The present invention provides a control rod drive system (CRDS) that overcomes the foregoing problems and yields a number of additional benefits, which will be readily discerned from the description which follows. The present invention may be beneficially used for nuclear reactor vessel designs of a high head design described above (e.g. top of the reactor head located at a vertical distance greater than approximately 15 to 20 feet above the top of the nuclear fuel core), but has broader application as well to virtually any reactor vessel design.

In one configuration, a control rod drive system (CRDS) generally includes a drive rod mechanically coupled to a control rod drive mechanism operable to linearly raise and lower the drive rod along a vertical axis, a rod cluster control assembly (RCCA) comprising a plurality of control rods positioned proximate to and insertable into a nuclear fuel core, and a drive rod extension (DRE) releasably engaged between the drive rod and RCCA. The CRDS is remotely operable to selectively couple and uncouple the DRE from the RCCA and drive rod. The CRDM includes an electro-magnet which releasably couples the CRDM to DRE. This arrangement contrasts to known CRDSs in which the drive rod is directly coupled to the RCCA, which is unsuitable in situations requiring drive rods with excessively long lengths (e.g. greater than 15-20 feet). In the event of a power loss or SCRAM, the CRDM may be configured to remotely uncouple the RCCA from the DRE without releasing or dropping the drive rod which remains engaged with the CRDM and in axial position. Advantageously, this protects the integrity of the CRDM and eliminates potential problems with known designs caused by dropping the drive rod which may damage equipment, as described above. The present DRE includes unique features providing the remote coupling and uncoupling functionality, and failsafe operation in the event of a power loss or SCRAM, as further described herein.

According to one exemplary embodiment of the present invention, a control rod drive system for a nuclear reactor vessel includes: a vertically oriented drive rod mechanically coupled to a control rod drive mechanism operable to raise and lower the drive rod through a plurality of axial positions; a rod cluster control assembly comprising a plurality of control rods configured for removable insertion into a nuclear fuel core; a drive rod extension extending axially between the rod cluster control assembly and the drive rod, the drive rod extension having a bottom end releasably coupled to the rod cluster control assembly; and a drive rod extension grapple assembly connected to the drive rod, the grapple assembly releasably coupled to a top end of the drive rod extension. Raising and lowering the drive rod raises and lowers the rod cluster control assembly. In one embodiment, the grapple assembly includes an electromagnet which magnetically couples the drive rod extension to the grapple assembly when the electromagnet is energized and uncouples the drive rod extension from the grapple assembly when the electromagnet is de-energized.

According to another exemplary embodiment, a control rod drive system for a nuclear reactor vessel includes: a control rod drive mechanism mounted externally to the reactor vessel; a drive rod mechanically coupled to the control rod drive mechanism and extending through the reactor vessel into an interior cavity of the reactor vessel holding a nuclear fuel core, the control rod drive mechanism operable to raise and lower the drive rod through a plurality of vertical axial positions; a grapple assembly connected to the drive rod in the interior cavity of the reactor vessel and movable with the drive rod; an electromagnet mounted in the grapple assembly; a rod cluster control assembly comprising a plurality of control rods configured for removable insertion into the nuclear fuel core; and a drive rod extension extending axially between the rod cluster control assembly and the grapple assembly. The drive rod extension includes: an axially extending actuator shaft having a top end including a magnetic block configured to releasably engage the electromagnet of the grapple assembly and a bottom end configured to releasably engage the rod cluster control assembly; and a lifting head sleeve including a diametrically enlarged lifting head, the lifting head sleeve slidably receiving the actuating rod therethrough for axial upward and downward movement. The electromagnet is operable to magnetically couple the actuating shaft to the grapple assembly at the top of the drive rod extension when the electromagnet is energized and uncouple the actuating shaft from the rod cluster control assembly at the bottom of the drive rod extension when the electromagnet is de-energized. Raising the actuator shaft when the electromagnet is energized couples the actuator shaft to the rod cluster control assembly and de-energizing the electromagnet lowers and uncouples the actuating shaft from the rod cluster control assembly.

According to another exemplary embodiment, a control rod drive system for a nuclear reactor vessel includes: a reactor vessel having a top head and an interior cavity; a nuclear fuel core supported in the interior cavity of the reactor vessel; a rod cluster control assembly comprising a plurality of control rods configured for removable insertion into the nuclear fuel core; a control rod drive mechanism mounted externally to the reactor vessel above the top head; a drive rod mechanically coupled to the control rod drive mechanism and extending through the top head of reactor vessel into the interior cavity, the control rod drive mechanism operable to raise and lower the drive rod through a plurality of vertical axial positions; a grapple assembly connected to the drive rod inside the interior cavity of the reactor vessel and movable with the drive rod, the grapple assembly including an electromagnet; a drive rod extension extending axially between the rod cluster control assembly and the grapple assembly, the drive rod extension including a bottom end releasably coupled to the rod cluster control assembly and a top end releasably coupled to the grapple assembly via the electromagnet; and a longitudinally-extending drive rod extension support structure mounted in the reactor vessel above the nuclear fuel core, the support structure including a plurality of vertically-oriented guide tubes at least one of which is configured to slidably receive the drive rod extension therein for axial upward and downward movement. The electromagnet is operable to magnetically couple the drive rod extension to the grapple assembly when the electromagnet is energized and uncouple the drive rod extension from the grapple assembly when the electromagnet is de-energized. De-energizing the electromagnet drops and uncouples the drive rod extension from the rod cluster control assembly remotely at the bottom of the drive rod extension.

An exemplary method for coupling a control rod drive mechanism to a rod cluster control assembly in a nuclear reactor vessel is provided. The method includes the steps of: providing: a reactor vessel having a top head and an interior cavity; a nuclear fuel core supported in the interior cavity; a rod cluster control assembly positioned at a top of the fuel core and comprising a plurality of control rods configured for removable insertion the fuel core; a control rod drive mechanism mounted externally above the reactor vessel; a drive rod assembly including a drive rod mechanically coupled to the control rod drive mechanism and extending into the interior cavity of the reactor vessel, and a grapple assembly disposed on an end of the drive rod and including an electromagnet. The method further includes lowering the drive rod assembly; contacting the drive rod assembly with a top end of a drive rod extension extending vertically between the rod cluster control assembly and the top head of the reactor vessel, a bottom end of the drive rod extension contacting the rod cluster control assembly in a non-locking manner; energizing the electromagnet to magnetically couple the drive rod assembly with the drive rod extension; raising the drive rod assembly by a first vertical distance; locking the bottom end of the drive rod extension with the rod cluster control assembly, wherein raising and lowering the drive rod assembly with the control rod drive mechanism raises and lowers the rod cluster control assembly for controlling the reactivity within the fuel core.

BRIEF DESCRIPTION OF THE DRAWINGS

The features of the exemplary embodiments of the present invention will be described with reference to the following drawings, where like elements are labeled similarly, and in which:

All drawings are schematic and not necessarily to scale. Parts given a reference numerical designation in one figure may be considered to be the same parts where they appear in other figures without a numerical designation for brevity unless specifically labeled with a different part number and described herein. In addition, a reference to a single figure number prefix (e.g. FIG. 10) which comprises multiple figures of the same prefix number distinguished by different alphabetical suffixes (e.g. FIGS. 10A and 10B) shall be construed as a general reference to all figures sharing that same prefix number.

DETAILED DESCRIPTION OF THE EMBODIMENTS

Figure 1:
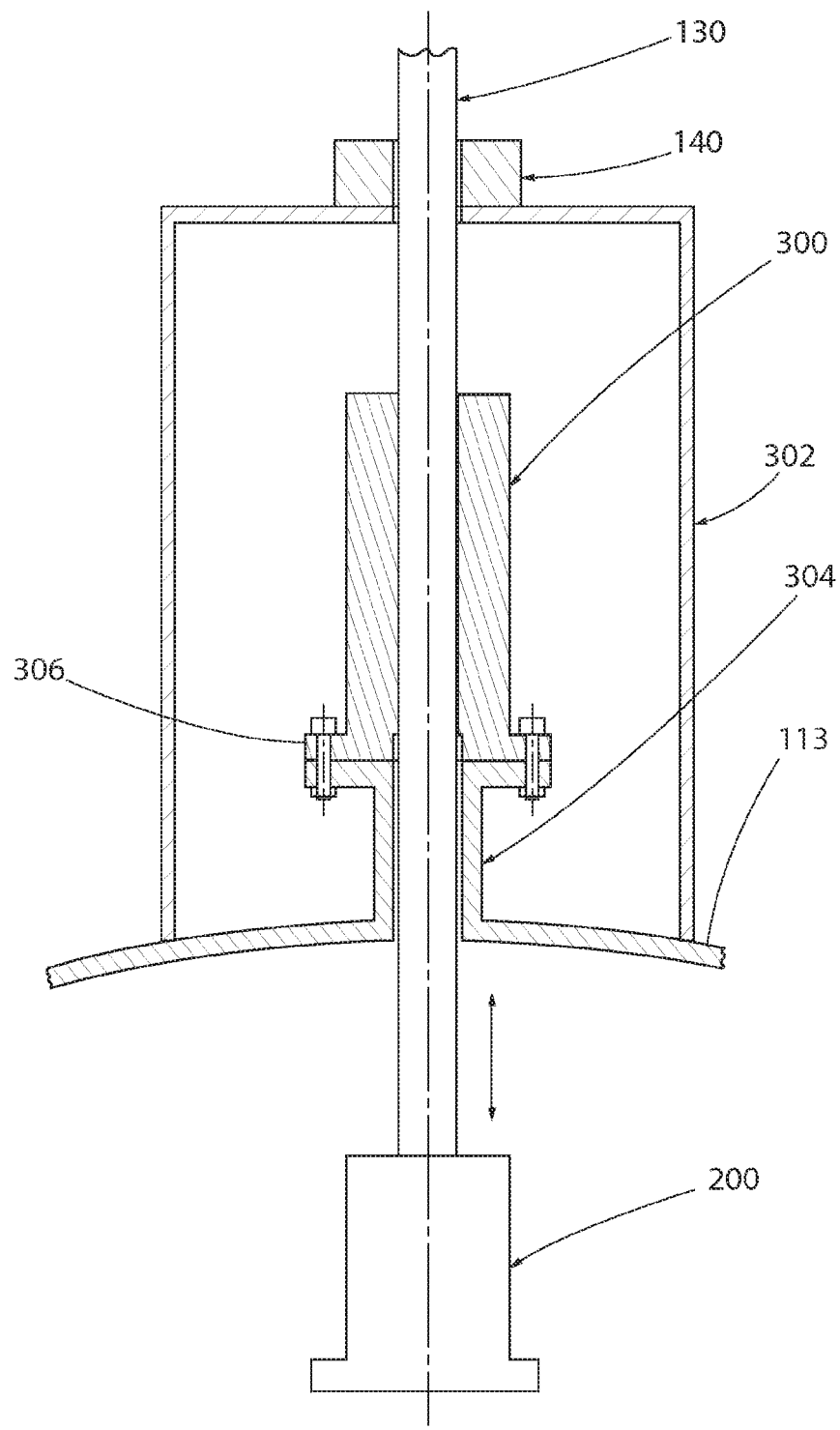
FIG. 1 is a side elevation diagrammatic view of the upper head portion of a nuclear reactor vessel with an exemplary embodiment of control rod drive system according to the present disclosure.

The features and benefits of the invention are illustrated and described herein by reference to exemplary embodiments. This description of exemplary embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Accordingly, the disclosure expressly should not be limited to such exemplary embodiments illustrating some possible non-limiting combination of features that may exist alone or in other combinations of features.

System Component Definitions

In one non-limiting example to provide an overview, a control rod drive system according to the present disclosure may generally include the following major assemblies defined below in summary fashion and further described herein in greater detail:

Rod ejection protection device (REPD)—a hydraulically-actuated mechanically-returned collet which engages the drive rod of the CRDM and prevents the drive rod from moving in position in the event of a failure of the CRDS.

Control rod drive mechanism (CRDM)—An electro mechanical device used to control the position of the Control Rods located in the reactor core Drive rod (DR)—A shaft that passes through the CRDM into the reactor vessel through the reactor vessel nozzle and is attached to the DREGA.

Drive rod extension grapple assembly (DREGA)—An assembly that is used to connect the DR to the DRE. This assembly also contains an electromagnet which, when energized and de-energized, engages and disengages the DRE with the RCCA respectively.

Drive rod extension support structure (DRESS)—a support structure designed to hold and guide the DREs. In one illustrative embodiment, for example without limitation, the DRESS may include thirty seven guide tubes. The guide tubes may be perforated to allow for water circulation (e.g. primary coolant) therethrough. Retaining collars (located at the top of the DRESS) may hold spring loaded retention devices. These devices attach to the DRE lifting head sleeve. Their purpose is to prevent the guide DRE from being removed from the DRESS inadvertently during reactor vessel head removal. The DRESS provides lateral and seismic restraint of the DREs.

Drive rod extension (DRE)—A device that is connected to the DR by means of the DREGA which extends the reach of the DR to engage the RCCA located below.

Figure 2:
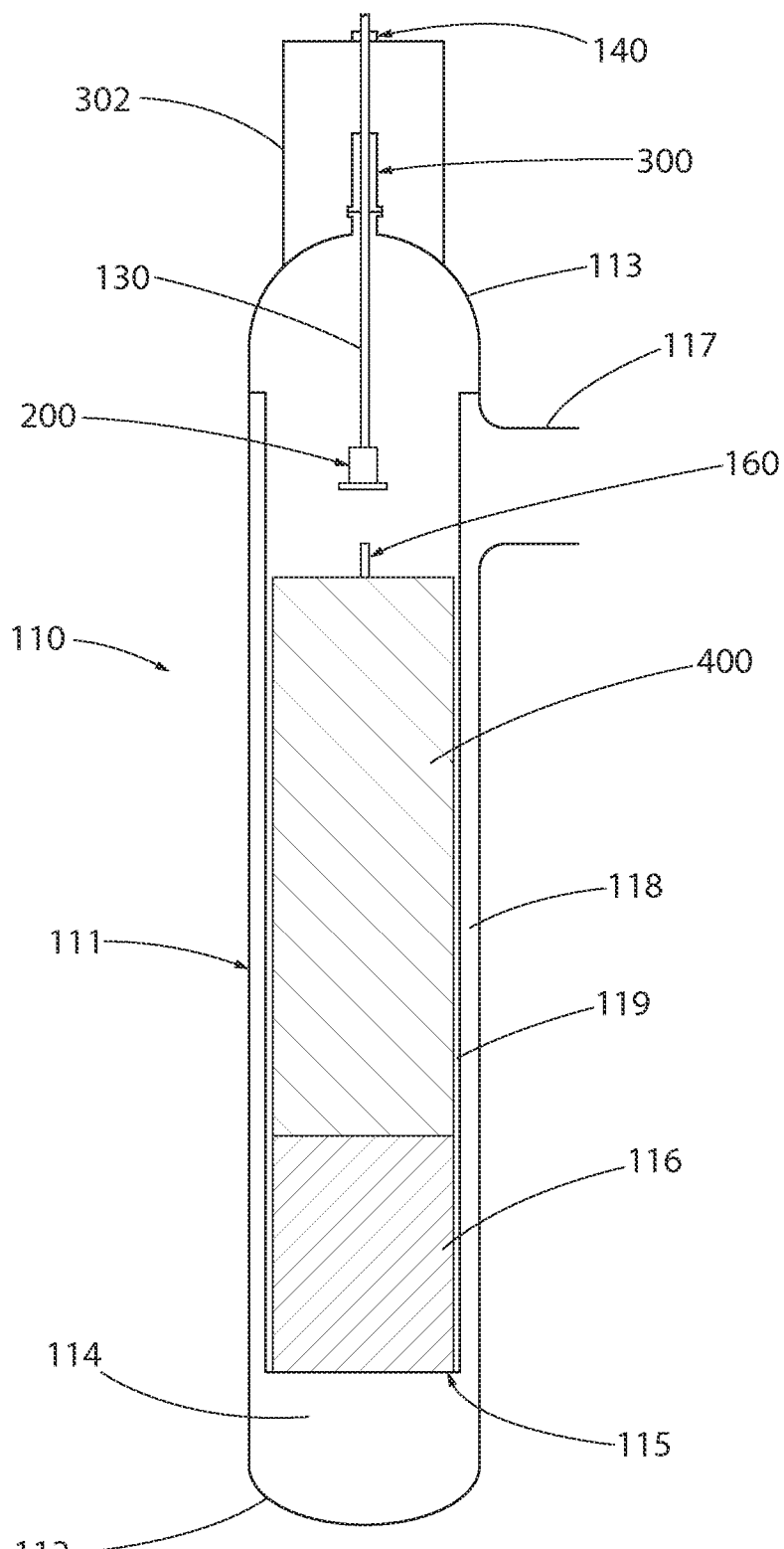
FIG. 2 is a side elevation diagrammatic view of the full reactor vessel of FIG. 1.

FIGS. 1 and 2 depict an exemplary embodiment of a control rod drive system 100. The control rod drive system 100 is shown installed on a reactor vessel 110 which includes a longitudinally-extending and elongated cylindrical shell 111 defining a vertical axis, bottom head 112, and top head 113. In one embodiment, the top head 113 may be removable form the shell 111 such as via a bolted flange joint or other form of detachable mounting. The reactor vessel defines an interior cavity 114 which holds a core support structure 115 configured to support a nuclear fuel core 116. In one embodiment, the core support structure 115 may be in the form of a tubular riser pipe 119 which conveys primary coolant flowing in an annular space 118 between the riser pipe 119 and shell 111 upwards through the fuel core 116 and outwards through a flow nozzle 117 fluidly coupled to a steam generator for generating steam. The primary coolant is heated by flow upwards through the fuel core 116. In one embodiment, the fuel core 116 may in the form of a self-supporting fuel cartridge such as the SMR-160 unitary fuel cartridge available from Holtec International which is insertable into the core support structure 115. As will be well known to those skilled in the art without undue elaboration, a typical nuclear reactor core in a light water reactor comprises tightly packed fuel assemblies 700 (also referred to as fuel bundles) as further shown in FIG. 8B. Each fuel assembly 700 is an assemblage of bundled fuel rods 702 which are sealed hollow cylindrical metal tubes (e.g. stainless steel or zirconium alloy) packed with enriched uranium fuel pellets and integral burnable poisons arranged in an engineered pattern to facilitate as uniform a burning profile of the fuel as possible (in both axial and cross sectional/transverse directions). Multiple longitudinally-extending cavities are formed within each fuel assembly 700 for insertion of the control rods 504 into the fuel core in the usual manner, such as through the top nozzles boxes 704 mounted atop each fuel assembly 700 which are disposed proximate to the bottom of the drive rod extension support structure (DRESS) 160 and accessible to the RCCAs 500. Numerous variations in the arrangement are possible.

It will be appreciated that numerous variations are possible in the arrangement of components within the reactor vessel 110; the foregoing arrangement described representing only one possible exemplary embodiment. Accordingly, the invention is not limited in this regard to the embodiment described herein.

As shown in FIG. 2, reactor vessel 110 may be considered a high head reactor vessel design in which the fuel core 116 is disposed near the bottom head 112 of the vessel within the core support structure 115 riser pipe. The distance between the top of the fuel core and top head 113 of the reactor vessel may exceed the usual 15-20 feet distance in typical pressurized light water reactors (PLWRs).

The reactor vessel 110 may be made of any suitable metal, such as for example without limitation steels such as stainless steel for corrosion resistance.

With continuing reference to FIGS. 1 and 2, control rod drive system 100 includes drive rod (DR) 130, drive rod extension (DRE) 400, drive rod extension support structure (DRESS) 160, drive rod extension grapple assembly (DREGA) 200, control rod drive mechanism (CRDM) 300, and rod ejection protection device (REPD) 140. Other than the DRESS 160 and fuel core 116 for which a single assembly of each may be provided for a reactor vessel 110, the control rod drive system (CRDS) 100 may actually include a plurality of the foregoing remaining components each associated with providing a lifting mechanism for raising/lowering one of the plurality of rod cluster control assemblies (RCCA) 500 (see, e.g. FIG. 11B) provided with the reactor vessel 110. Accordingly, there may in fact be a plurality of the component assemblies shown in FIGS. 1 and 2 although only a single CRDM 300 rod drive mechanism 300 and associated lifting components are shown for clarity of description. In one exemplary embodiment, for illustration, a reactor vessel 110 installation of a small modular reactor design may include approximately 37 CRDMs 300 and associated DREs 400. The invention is not limited to any particular number of CRDMs or other components.

Control rod drive mechanisms 300 may each be housed in a structural enclosure 302 mounted to top head 113 of reactor vessel 110 for protection of the drive mechanism. The function of this enclosure structure includes to provide lateral and seismic support of the CRDMs 300, protect the CRDMs from projectile or missile generated within the primary containment structure (not shown) which encloses the reactor vessel 110, protect the CRDMs from potential drops of equipment from the overhead crane, provide a means of lifting the reactor vessel head, and provide a mounting location for the REPD 140 which may be mounted on top of enclosure 302 in one embodiment. The CRDM enclosures 302 may be attached to the reactor vessel top head 113 by any suitable means, such as without limitation welding.

In one embodiment, the top head 113 of reactor vessel 110 may include a flanged nozzle 304 configured to receive a bottom mounting flange 306 on control rod drive mechanism 300 for coupling and supporting the drive mechanism from the reactor vessel head. The bottom mounting flange 306 may be detachably coupled to the flanged nozzle 304 with fasteners (e.g. bolts and nuts) to allow the control rod drive mechanism 300 to be removed for maintenance or replacement. The drive rod 130 extends vertically downwards through the rod ejection protection device 140, top of the enclosure 302, control rod drive mechanism 300, and further through the flanged nozzle 304 into the top portion of reactor vessel beneath top head 113 as shown in FIGS. 1 and 2. A set of seals may be provided with the drive rod 130 at the flanged nozzle 304 to prevent leakage of reactor coolant from the reactor vessel along the drive rod during operation. The bottom end of the drive rod 130 is coupled to the drive rod extension grapple assembly (DREGA) 200, as further described herein.

Figure 18:
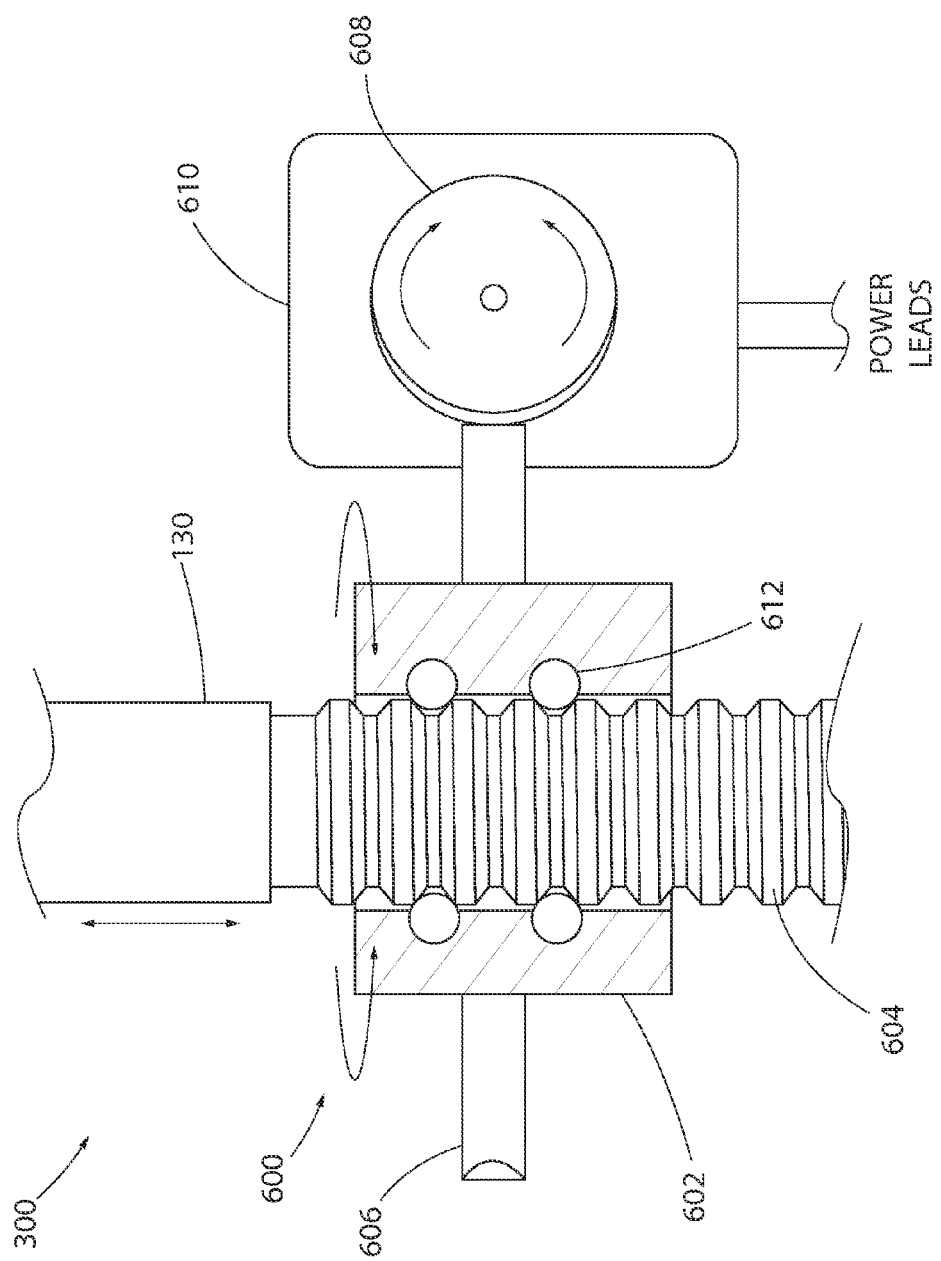
FIG. 18 shows a diagrammatic illustration of an exemplary control rod drive mechanism.

Control rod drive mechanism (CRDM) 300 may be any type of commercially available electro-mechanical drive operable to lower/raise the drive rod 130 (and in turn DREGA 200 attached to the drive rod). As one non-limiting example diagrammatically illustrated in FIG. 18, a CRDM 300 of one type may have a drive assembly 600 generally utilizing a motor drive to rotate a lead screw 604 formed on the drive rod 130. Such drive mechanisms for drive rods are well known to those skilled in the art. In one arrangement, as shown, the electric drive motor 610 may be axially offset from the drive rod 130 and rotates a worm 608 (i.e. worm gear) arranged transversely to the drive rod. The worm 608 in turn rotates a ring gear 606 rigidly affixed to a ball collar or nut or collar 602 having ball bearings 612 engaged with the lead screw 604 on the drive rod 130. Rotating the ring gear 606 in opposing directions using the motor drive 610 which operates to rotate the worm 608 in opposing rotational directions alternatingly axially raises or lowers the drive rod 130 in a controlled manner. In other possible arrangements, the ball nut or collar may be directly coupled to the drive motor which may be arranged axially in line with the drive rod. In either of the foregoing arrangements, the CRDM rotates the ball nut or collar which axially advances or retracts the drive rod via the lead screw. Numerous variations of CRDMs using drive rod lead screws are possible. CRDMs are commercially available from a number of manufacturers, including for example General Atomics of San Diego, Calif. CRDMs are further described in U.S. Pat.

No. 5,999,583 and U.S. Patent Application Publication 2010/0316177, which are incorporated herein by reference in their entireties.

Figure 3:
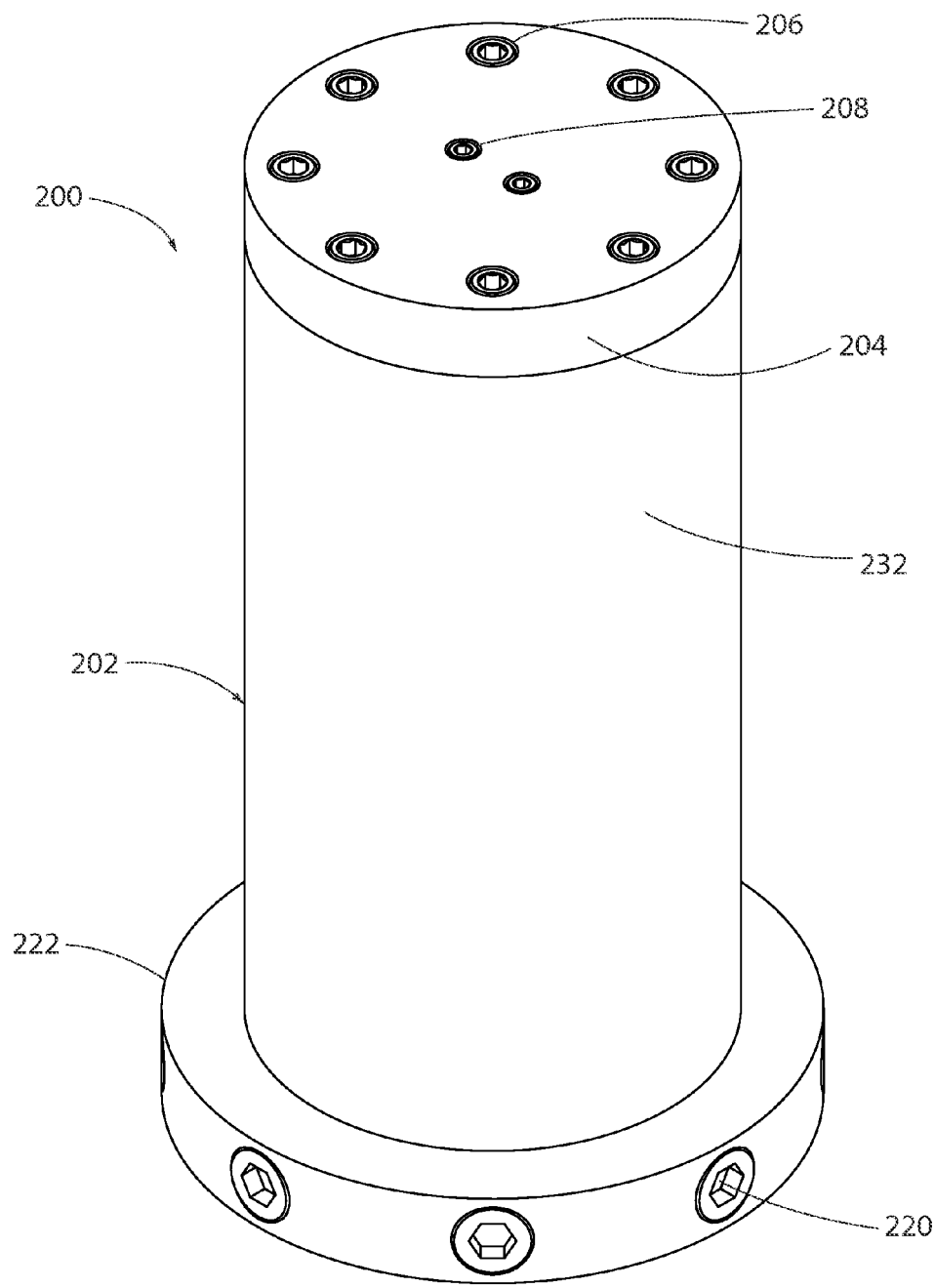
FIG. 3 is a perspective view of a drive rod extension grapple assembly.
Figure 4:
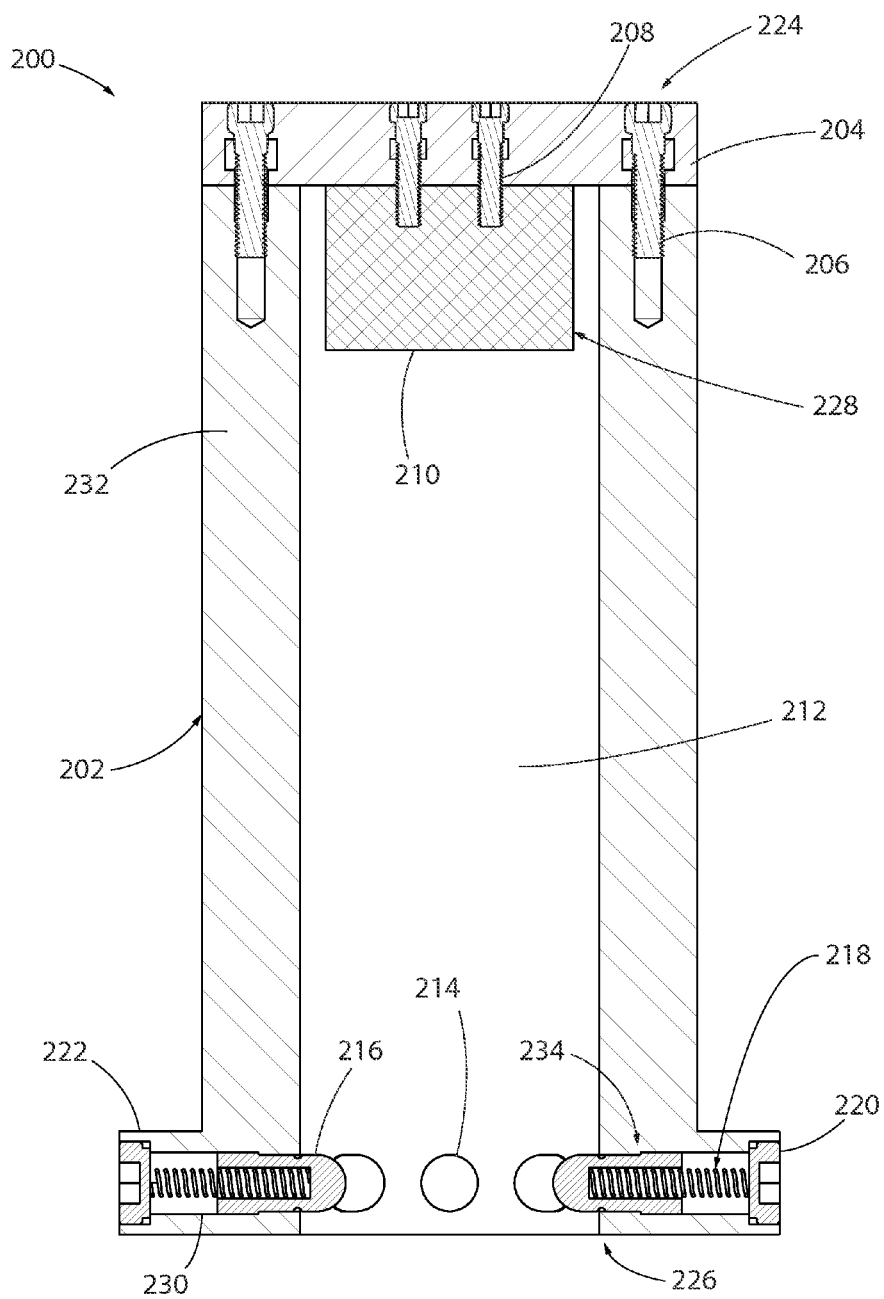
FIG. 4 is a side cross-sectional view thereof.

FIGS. 3 and 4 show drive rod extension grapple assembly (DREGA) 200 in greater detail. DREGA 200 includes a cylindrical grapple body 202 having sidewalls 232 defining an interior chamber 212, an open top 224, and a downwardly open bottom 226. Top 224 may be closed by a removable top plate 204 in one embodiment which is attached to the top annular face of grapple body 202 via a plurality of circumferentially spaced fasteners 206. The open bottom 226 allows an upper portion of drive rod extension 400 to be inserted therein, as further described herein. An electromagnet 228 is disposed in chamber 212 which is engageable with a magnetic block 402 of drive rod extension 400 (see, e.g. FIG. 9). In one embodiment, electromagnet 228 may be mounted at the top end of chamber 212 and affixed to the underside of top plate 204 by one or more fasteners 208. Other variations for mounting electromagnet 228 are possible.

With continuing reference to FIGS. 3 and 4, drive rod extension grapple assembly (DREGA) 200 further includes plurality of circumferentially spaced and radially movable lifting pins 216. Lifting pins 216 may be oriented horizontally in one embodiment and are operable to project radially inwards into chamber 212 towards the vertical centerline of grapple body 202 through corresponding circumferentially spaced openings 214 formed through the body. The lifting pins 216 are radially movable between a projected position (shown in FIG. 4) extending partially into the chamber 212 and a retracted position withdrawn from the chamber. Lifting pins 216 may each be biased inwards towards the projected position via a suitably configured lift spring 218 having an end which engages an outward facing open socket formed in each pin as shown.

In one embodiment, lifting pins 216 may be movably disposed in an annular shaped housing 222 which extends radially outwards from grapple body 202. Housing 222 includes a plurality of circumferentially spaced bores 230 having a circular cross section configured to slidably receive lifting pins 216 therein. Bores 230 may extend radially completely through the housing 222 and sidewalls 232 of grapple body 202 communicating with openings 214. Each bore 230 includes a lifting pin 216 and associated spring 218. The lifting pins 216 may include a stepped shoulder 234 which engages a complementary configured stepped portion of the bore 230 to prevent the lifting pins from being ejected by the spring 218 completely through holes 214 into the chamber 212 of the grapple body 202. In one embodiment, the exterior opening in each bore 230 may be closed off by a removable cap 220 which threadably engages the annular housing 222. The caps 220 each have an interior surface which may engage one end of spring 218. In one embodiment, the annular housing 222 may be threaded along an exterior portion surrounding each bore 230 and the caps 220 may threadably engage these threaded bore surfaces. Other suitable arrangements of mounting caps 220 to close bores 230 may be used.

The drive rod extension grapple assembly (DREGA) 200 may be mounted to the bottom end of the drive rod 130 by any suitable means. For example, without limitation, drive rod 130 may be threadably coupled directly to DREGA 200 via a threaded socket formed in the top plate 204 and threading the bottom end of the drive rod, via mounting brackets and fasteners, welding, or other suitable mechanical mounting techniques used in the art. Preferably, in certain embodiments, DREGA 200 is rigidly mounted to the drive rod 130.

In one embodiment, cylindrical grapple body 202 may have a maximum outside diameter larger than the interior diameter of the flanged nozzle 304 so that the DREGA A cannot be inserted or retracted through the nozzle. In such an arrangement, the DREGA 200 is connected to the end of the drive rod 130 beneath the top head 113 of the reactor vessel 110. Other suitable arrangements are possible.

FIGS. 5-8 (including all alphabetical subparts) depict the drive rod extension support structure (DRESS) 160. DRESS 160 is a vertically elongated structure which includes a plurality of upper guide tubes 161 and lower guide tubes 162 circumscribed by an open lattice outer support frame 163 having a cylindrical shape to complement the shape of the riser pipe 119 in which the DRESS may be inserted from the top. The open structure reduces the weight of the support frame 163 while providing structural strength. In one exemplary embodiment, without limitation, the outer support frame 163 may have an X-shaped lattice formed by diagonal supports 164 arranged in an X-pattern and enlarged junction plates 165 formed at the intersection of the diagonal supports. Other suitable open or closed structures are possible for support frame 163.

The upper and lower guide tubes 161, 162 may be intermittently supported along their lengths by axially spaced apart horizontal supports 166. A horizontal support 166 is provided at the top 166a and bottom 166b of DRESS 160. In one exemplary embodiment, the supports 166 may be spaced axially apart at approximately 5-6 feet intervals along the longitudinal length of the guide tubes 161, 162. Other appropriate axial spacing may be used.

In one embodiment, the horizontal supports 166 may be comprised of interconnected lateral grid plates 171 extending between adjacent guide tubes 161, 162. The outermost supports 166 may be attached at their ends to an annular shaped peripheral rim 169 which may be attached to the interior surface of the cylindrical outer support frame 163, such as at the junction plates 165 and/or along horizontal arcuately shaped strap members 167 connected between junction plates. In one embodiment, the horizontal supports 166 may be welded to the outer support frame; however, other suitable attachment methods may be used instead of or in addition to welding such as fasteners.

Figure 10A:
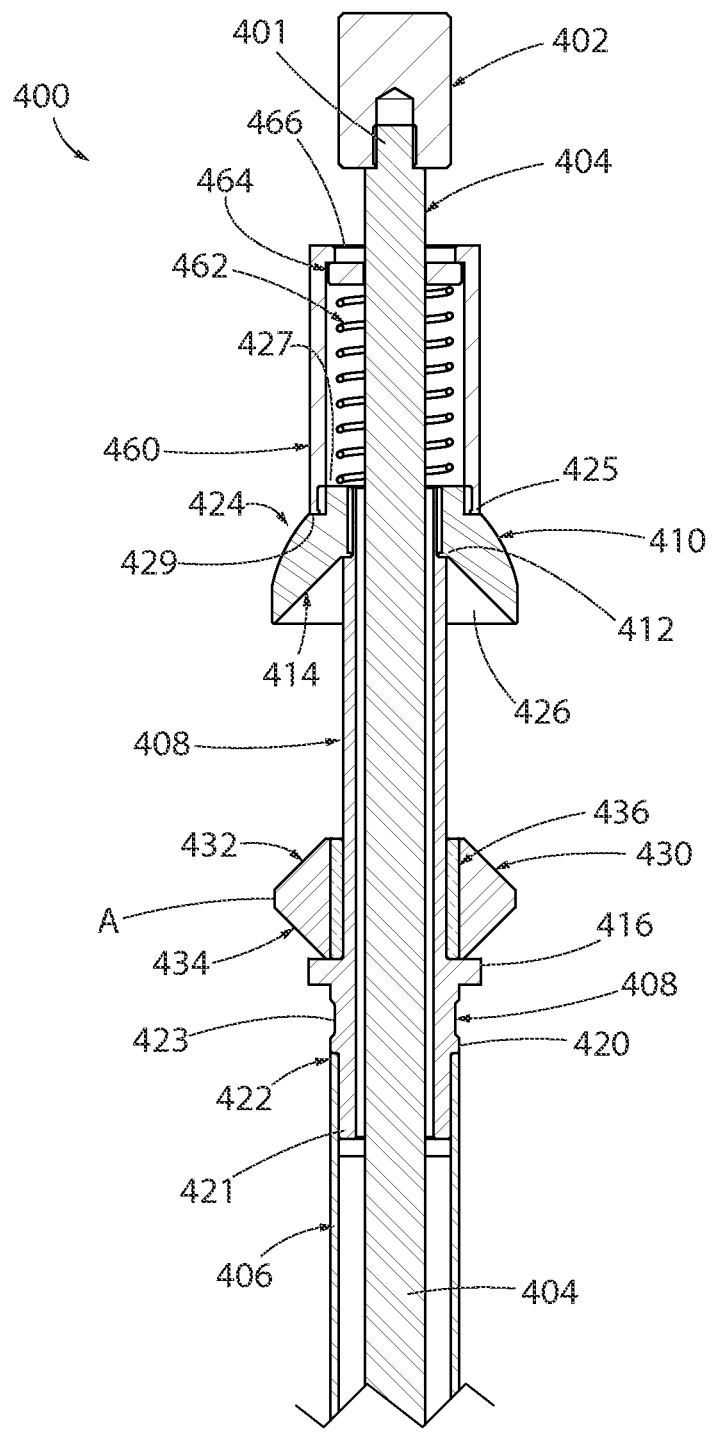
FIG. 10A is a side cross-sectional view of the upper portion of the drive rod extension shown in FIG. 9.
Figure 10B:
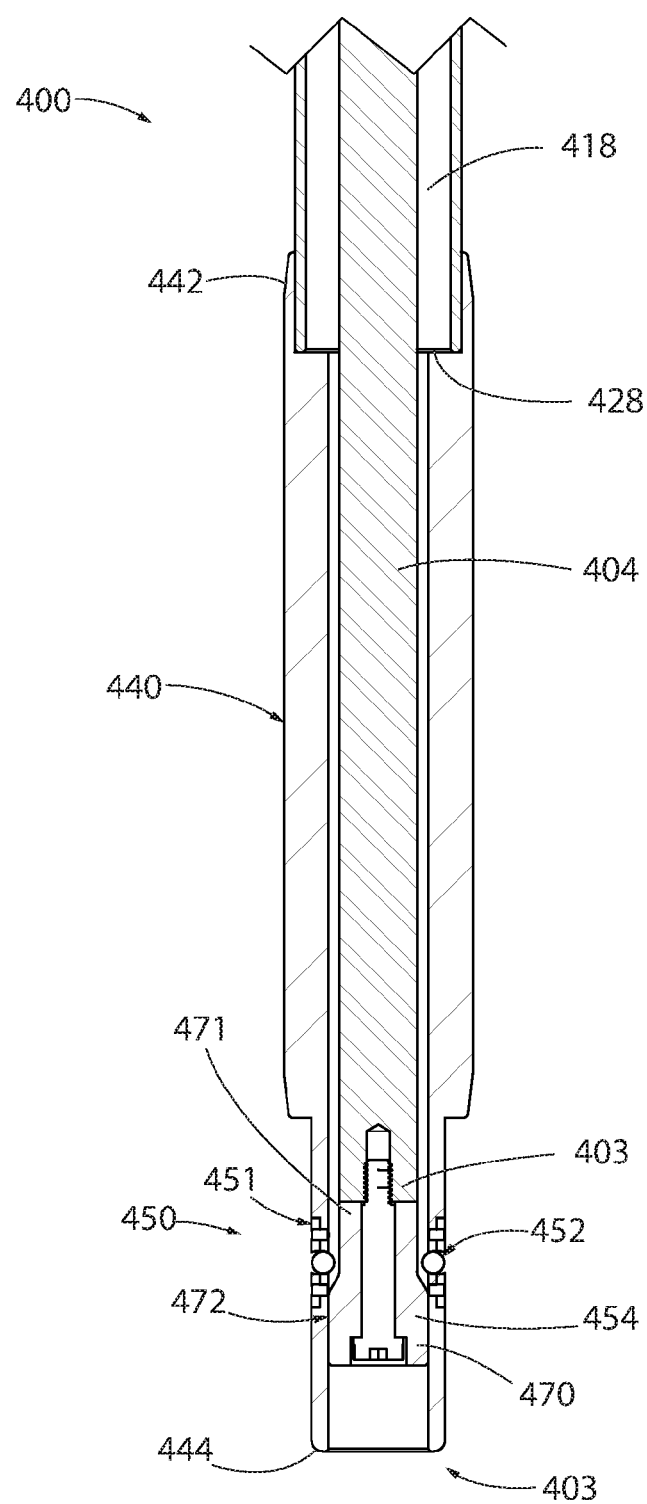
FIG. 10B is a side cross-sectional view of the lower portion of the drive rod extension shown in FIG. 9.

In one embodiment, the uppermost horizontal support 166 may include an array of laterally spaced circular retaining collars 170 mounted onto the top ends of each upper guide tube 161. This forms a grid array of retaining collars 170 having a pattern or layout in top plan view which matches the horizontal pattern or layout of the upper guide tubes 161. The retaining collars 170 each have a central opening configured to receive a respective upper guide tube therein. The retaining collars 170, located at the top of the drive rod extension support structure (DRESS) 160, may include spring loaded retention devices in the form of radially movable retaining pins 172 spaced circumferentially around the retaining collars (see, e.g. FIGS. 5A and 11A). The retaining pins 172 may be horizontally oriented and movable to be retracted from or projected into the central hole of the retaining collar 170. As noted above the retaining pins 172 engage the DRE lifting head sleeve 408 (see also FIGS. 10 and 11). One of their purposes is to prevent the guide DRE 400 from being removed from the DRESS 160 inadvertently during reactor vessel head removal.

The upper guide tubes 161 have a diameter selected to allow the drive rod extension (DRE) 400 to be axially inserted completely through the guide tube in one embodiment. This allows raising and lowering of the DREs 400 by the control rod drive mechanism (CRDM) 300. Each of the lower guide tubes 162 may have a larger diameter than the upper guide tubes 161. The lower guide tubes 162 have a diameter selected to allow the entire control rod support plate 502 of the rod cluster control assembly (RCCA) 500 (shown in FIG. 11B) to be raised and lowered within the lower guide tubes for inserting and retracting the control rods 504 into and from the fuel core 116. The control rod support plate 502 has a larger diameter than the widest component of the DRE 400 in the present exemplary embodiment, thereby necessitating a larger diameter for the lower guide tubes 162 than the upper guide tubes 161.

Figure 5B:
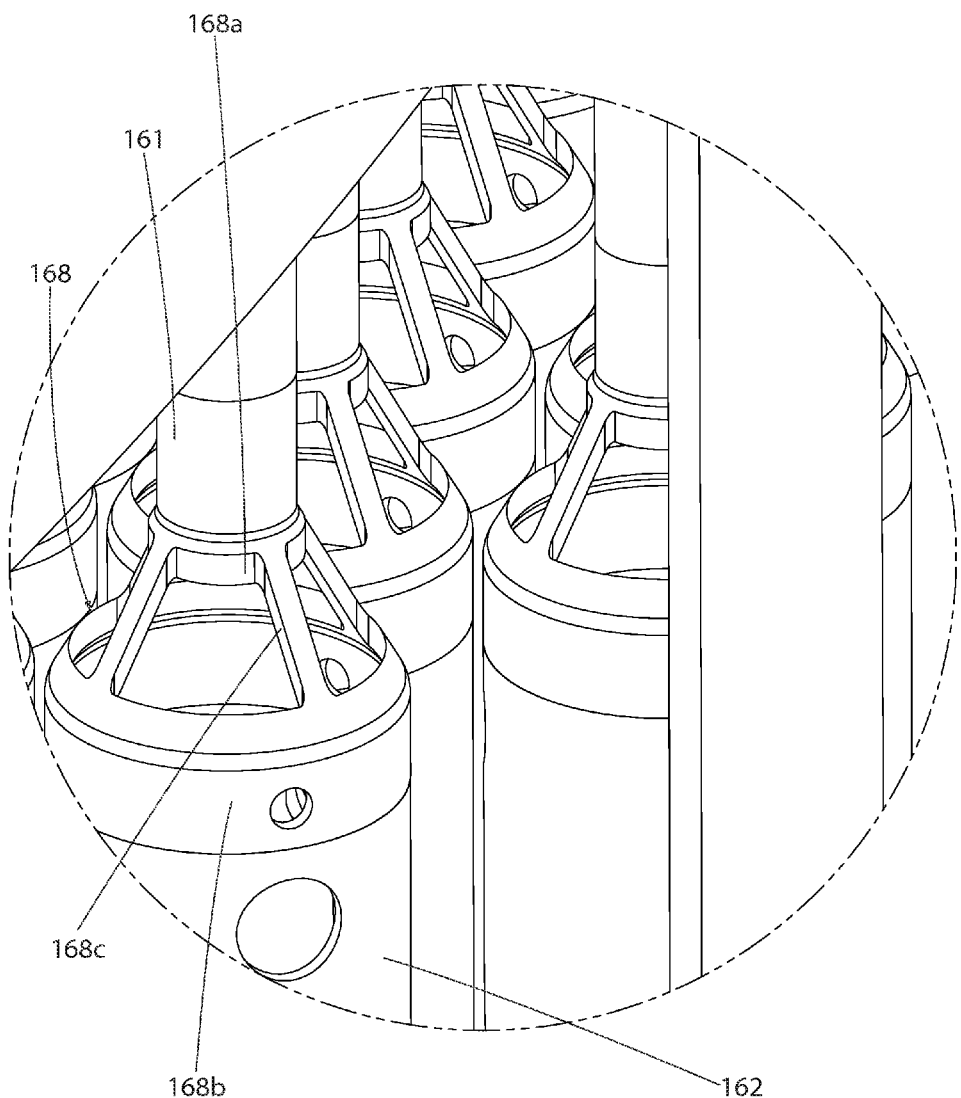
FIG. 5B is an enlarged detail VB taken from FIG. 5.
Figure 6:
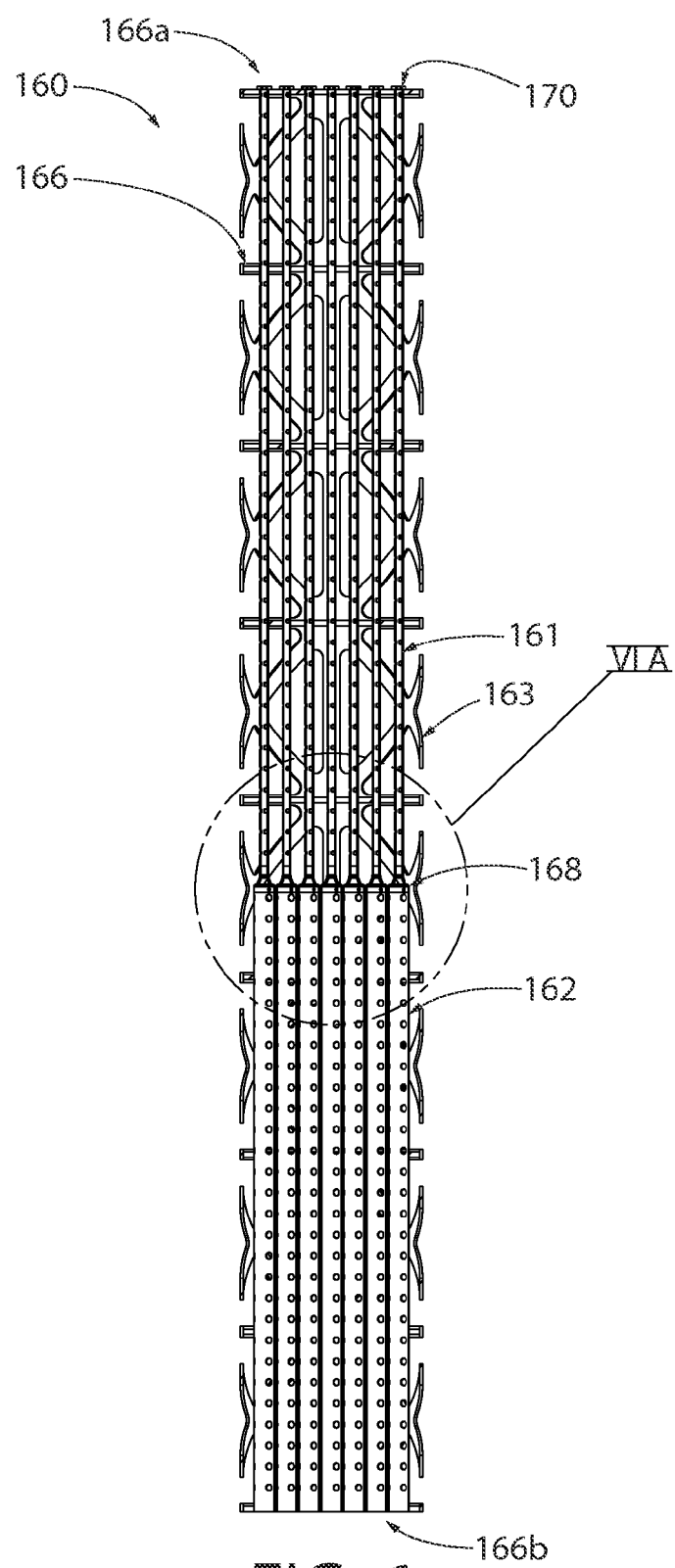
FIG. 6 is a side cross-sectional view of the drive rod extension support structure.
Figure 6A:
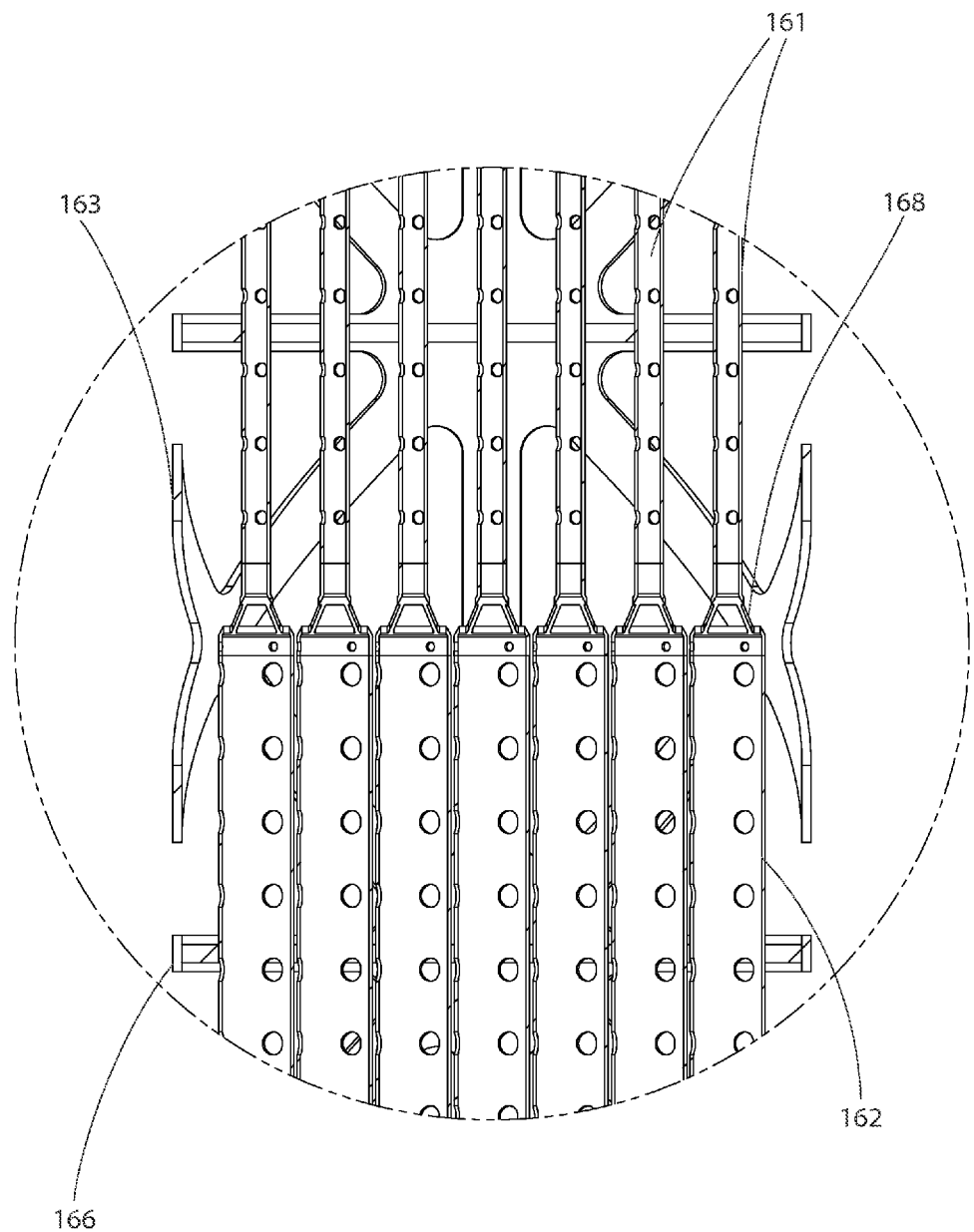
FIG. 6A is an enlarged detail VIA taken from FIG. 6.
Figure 7:
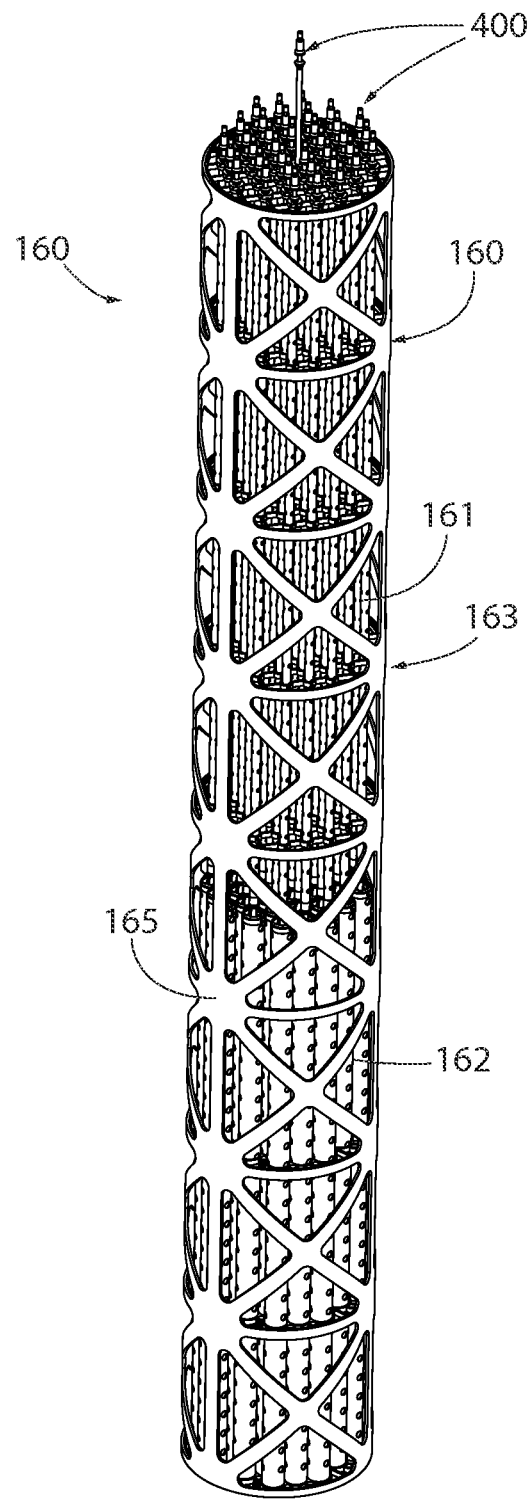
FIG. 7 is an perspective view of a drive rod extension support structure with drive rod extensions mounted therein.

In one embodiment, guide tube transition fittings 168 may be used to couple the lower ends of each upper smaller diameter upper guide tube 161 to a corresponding concentrically aligned lower guide tube 162. In one embodiment, the transition fittings 168 may be frusto-conical shaped as best shown in FIGS. 5B and 6A and have an open structure comprised of axially spaced apart upper and lower rings 168a, 168b each attached respectively to an upper and lower guide tube 161, 162. Accordingly, the lower rings 168b have a larger diameter than the upper rings 168a in this embodiment. The rings 168a, 168b may be joined to form a structural unit by angled and vertically extending struts 168c extending between the rings. In other embodiments, the guide tube transition fittings 168 may be closed. Other suitable configurations of guide tube transition fittings 168 are possible including non-frusto-conical shapes. The guide tube transition fittings 168 help maintain axial alignment between the upper and lower guide tubes 161, 162. The guide tubes 161, 162 in turn help maintain axial alignment of the control rods with respective corresponding cavities in the fuel core 118 for insertion or retraction of the rods to control the nuclear reaction rate in various portions of the core. Other suitable configurations of transition fitting, however, may be used and numerous variations are possible.

In some embodiments, the upper and lower guide tubes 161, 162 may each include a plurality of holes or perforations along their respective lengths as shown in FIGS. 5-8 which allow the primary coolant to flow inside the guide tubes within the riser pipe 119. The holes or perforations may be distributed both circumferentially and longitudinally around each guide tube 161, 162 in a suitable pattern.

Figure 8:
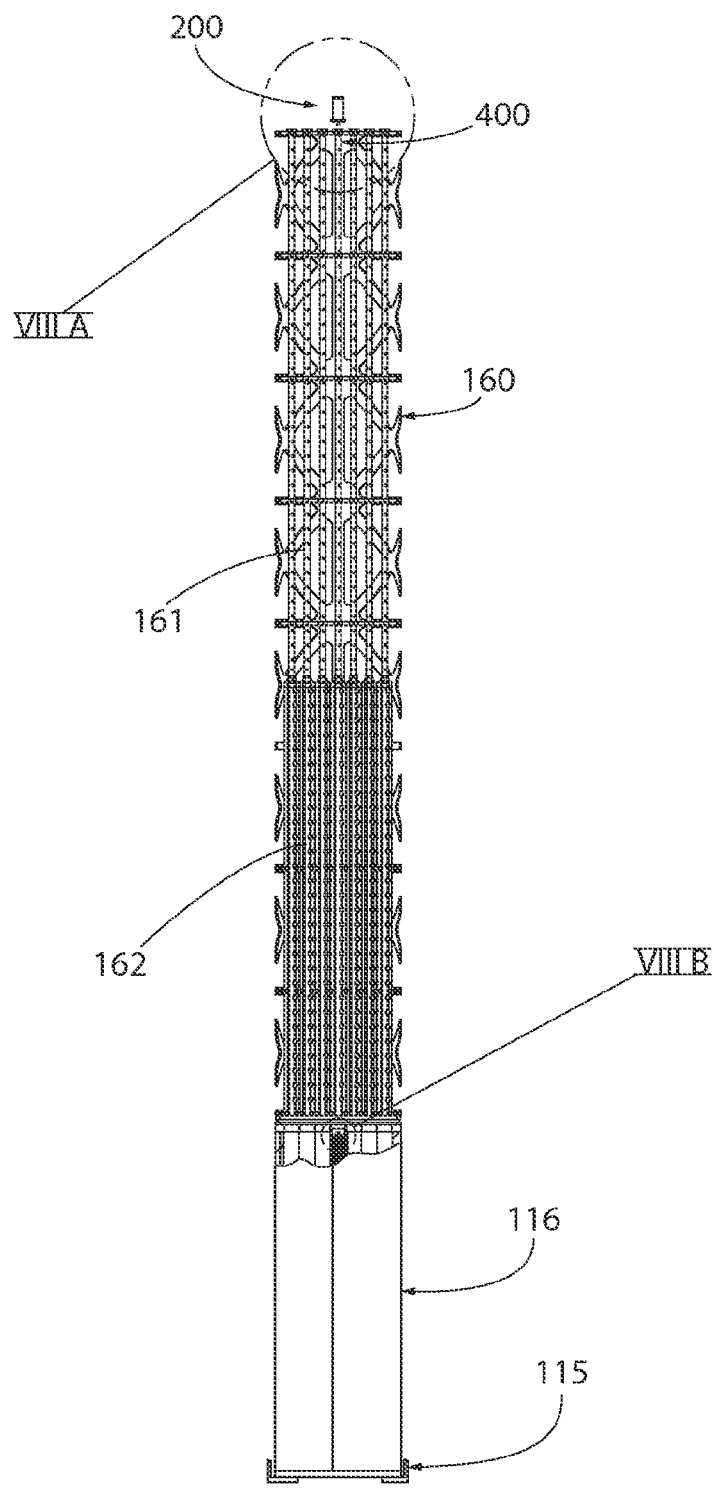
FIG. 8 is a side cross-sectional view of a drive rod extension support structure mounted above a nuclear fuel core.
Figure 8A:
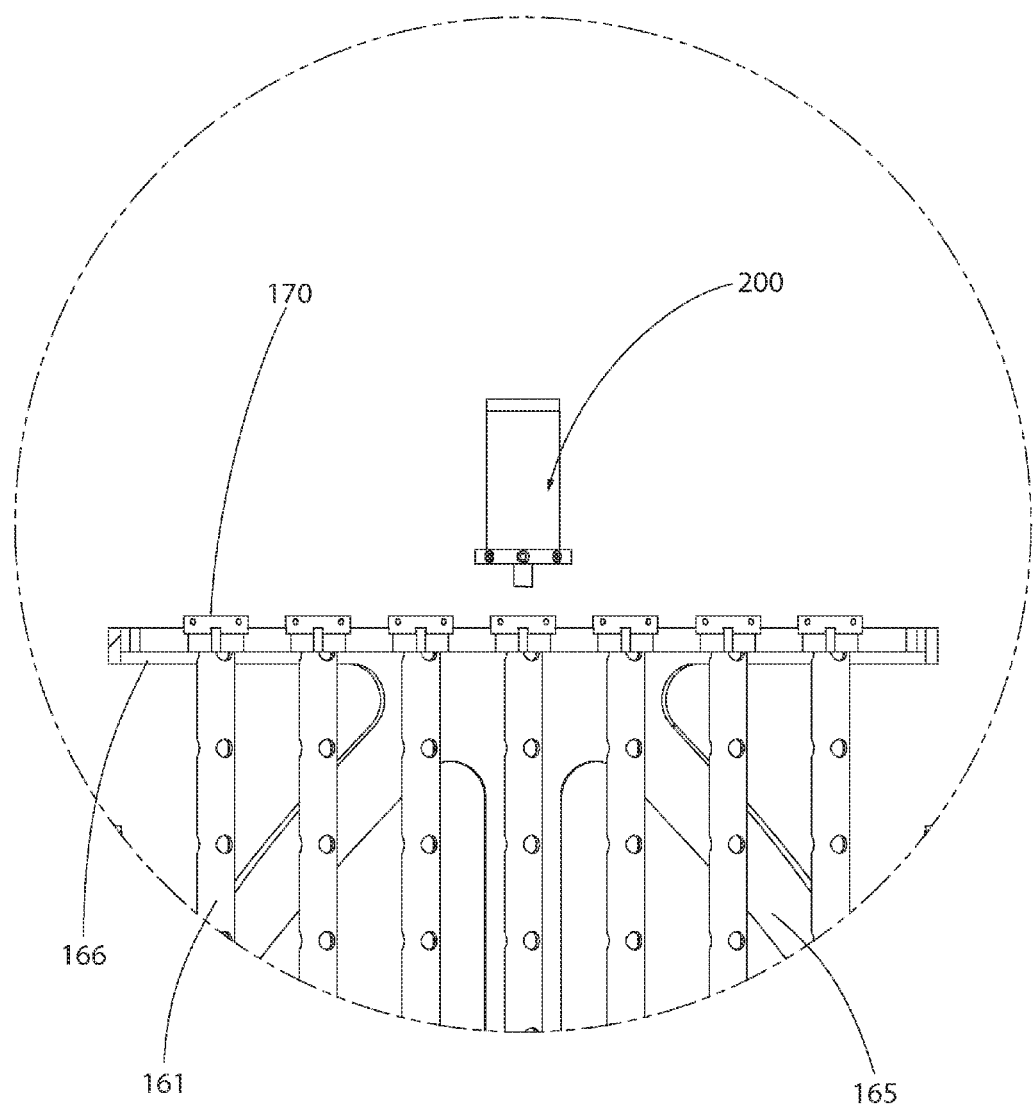
FIG. 8A is an enlarged detail VIIIA taken from FIG. 8.
Figure 8B:
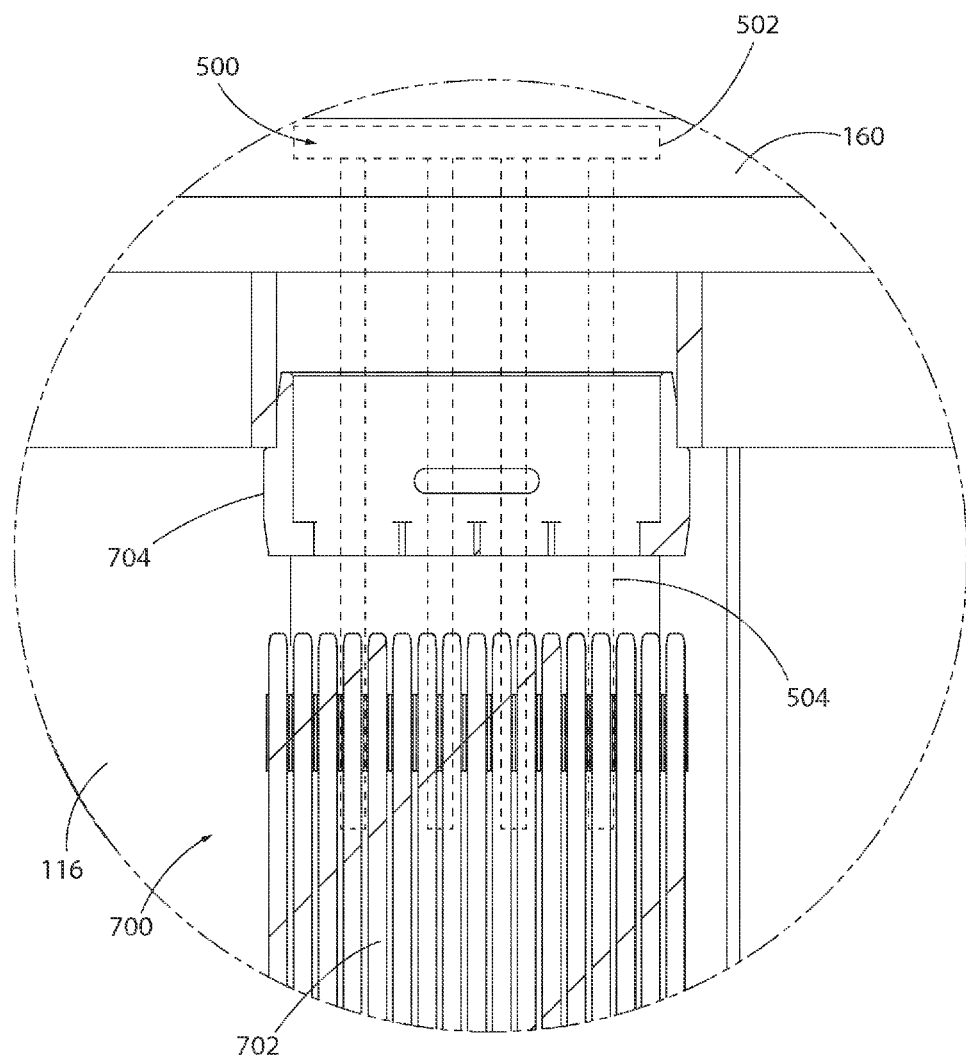
FIG. 8B is an enlarged detail VIIIB taken from FIG. 8.

Referring to FIGS. 2 and 8, the drive rod extension support structure (DRESS) 160 may be mounted inside the upper portion of riser pipe 119 proximate to the top of the fuel core 116. This allows the lower operating ends of each drive rod extensions (DREs) 400 which may be coupled and uncoupled from the rod cluster control assembly (RCCA) 500 to be in proper position for inserting or retracting the control rods 504 into/from the fuel core 116 for controlling the nuclear reaction rates in parts or all of the fuel core, as further described herein.

Figure 9:
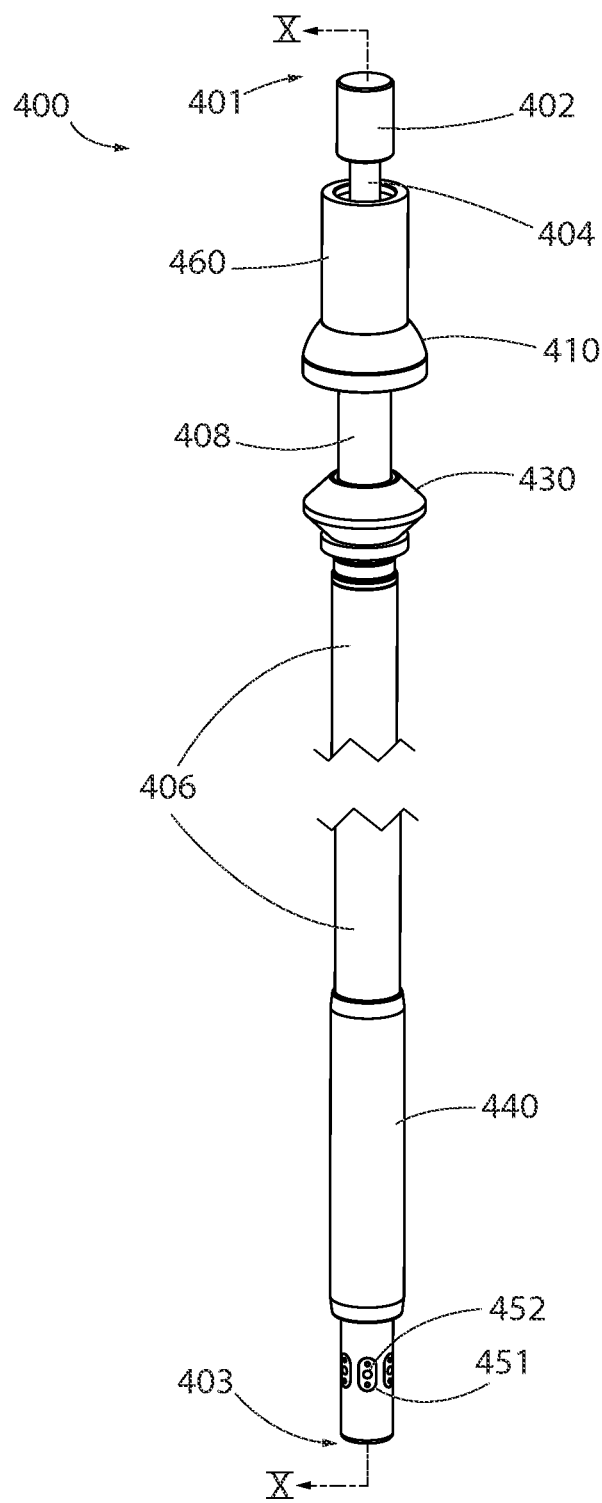
FIG. 9 is a perspective view of a drive rod extension.

FIGS. 9 and 10 show the drive rod extension (DRE) 400 in greater detail. Each DRE 400 is intermediate link which operably couples a drive rod 130 at top end 401 of the DRE to a corresponding rod cluster control assembly (RCCA) 500 at bottom end 403 of the DRE. DRE 400 includes an inner actuator shaft 404 which is disposed inside an outer actuator tube 406 and a lifting head sleeve 408. Actuator shaft 404 extends longitudinally for substantially the entire length of the DRE 400 and may be a single unitary structure in some embodiments.

In one embodiment, lifting head sleeve 408 is positioned at an upper portion of the DRE above the top of the drive rod extension support structure (DRESS) 160. Lifting head sleeve 408 has a bottom end 421 and a top end 412 that abuts a lower surface 414 of a diametrically enlarged lifting head 410. Axially spaced between ends 412 and 421 is an annular stop flange 416 extending radially outwards from lifting head sleeve 408. The stop flange 416 is configured to engage an axially movable bobbin 430 which is slidable on lifting head sleeve 408 and defines a lower travel stop for the bobbin. Stop flange 416 may be further arranged to engage the top of retaining collar 170 to limit the insertion depth of the lifting head sleeve into the upper guide tube 161 (see also FIG. 11A).

Lifting head sleeve 408 may further include a stepped portion 420 which defines a downward facing surface which abuts a top end 422 of actuator tube 406. In one embodiment, the bottom end 421 of lifting head sleeve 408 may be sized to be inserted into the open top end 422 of actuator tube 406.

Figure 5:
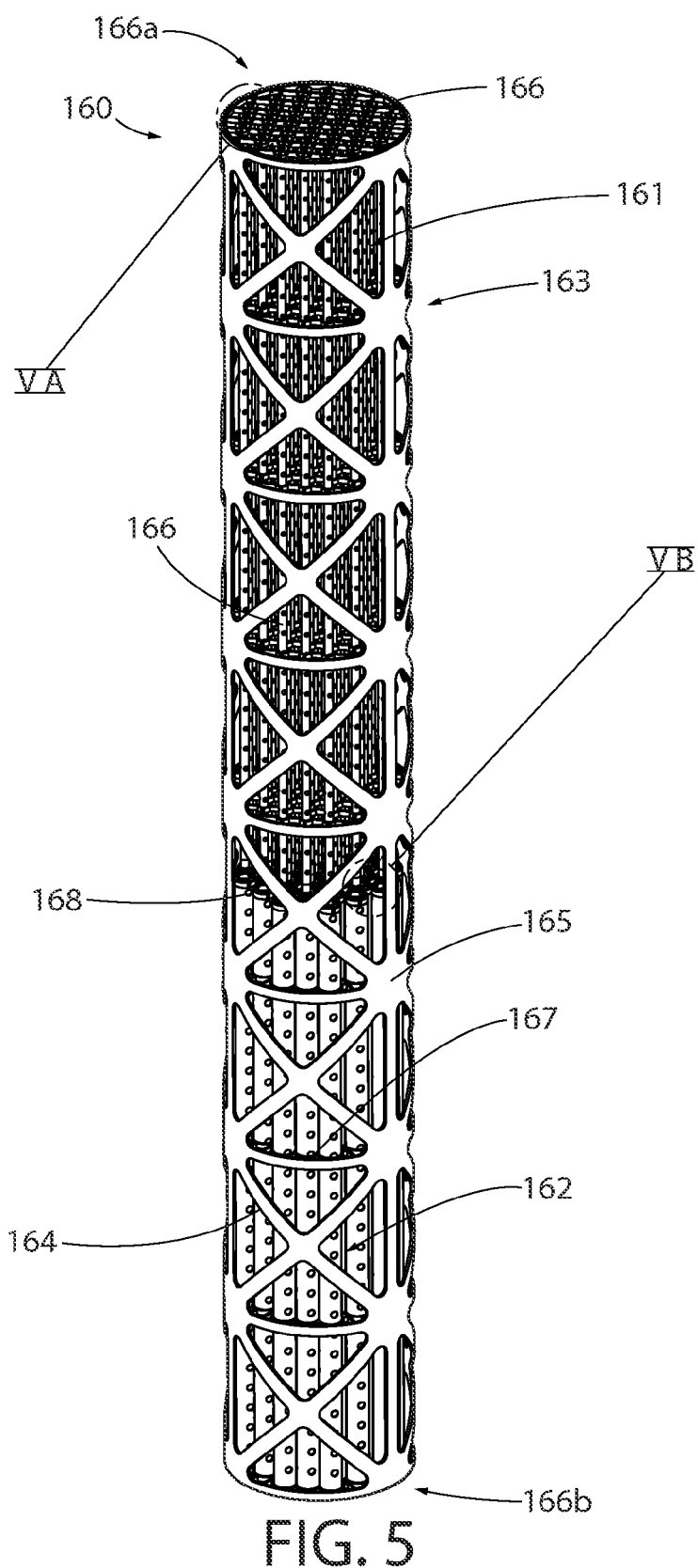
FIG. 5 is an perspective view of a drive rod extension support structure.
Figure 5A:
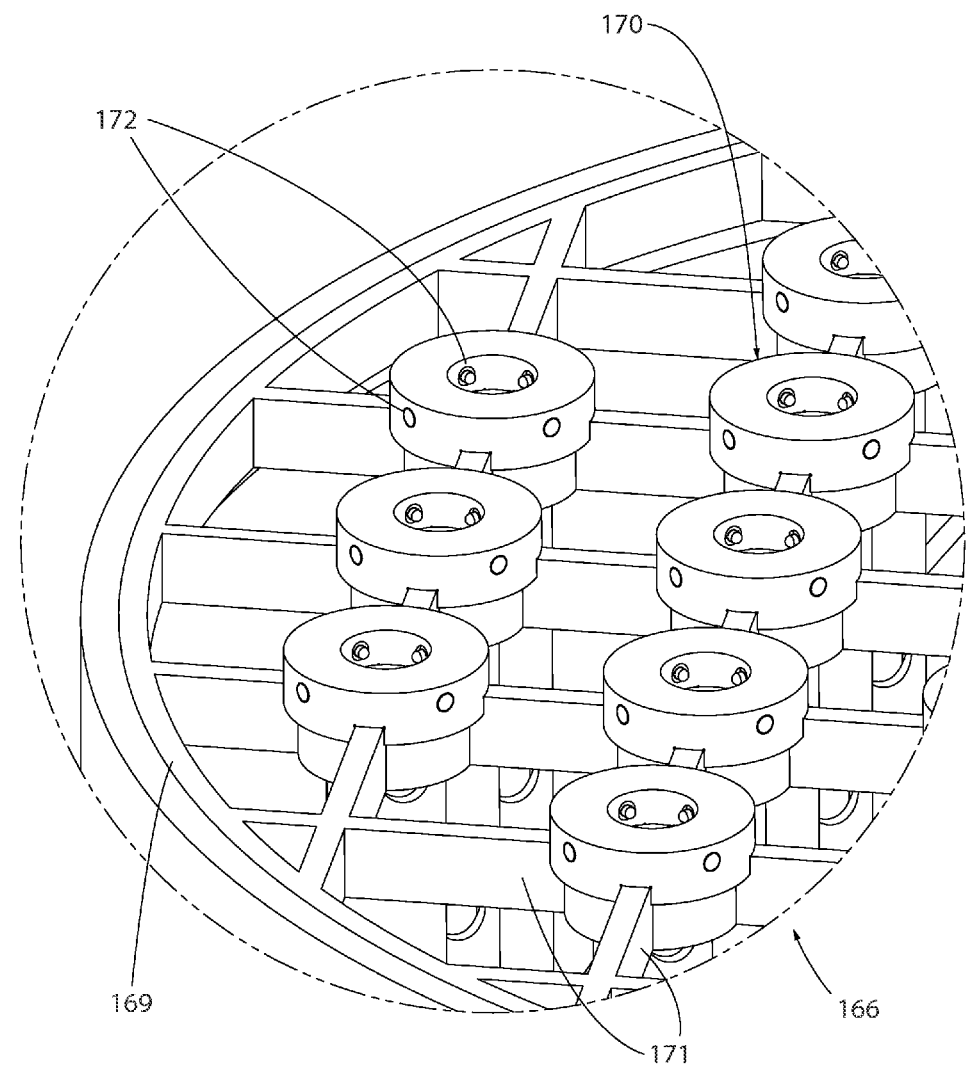
FIG. 5A is an enlarged detail VA taken from FIG. 5.
Figure 11A:
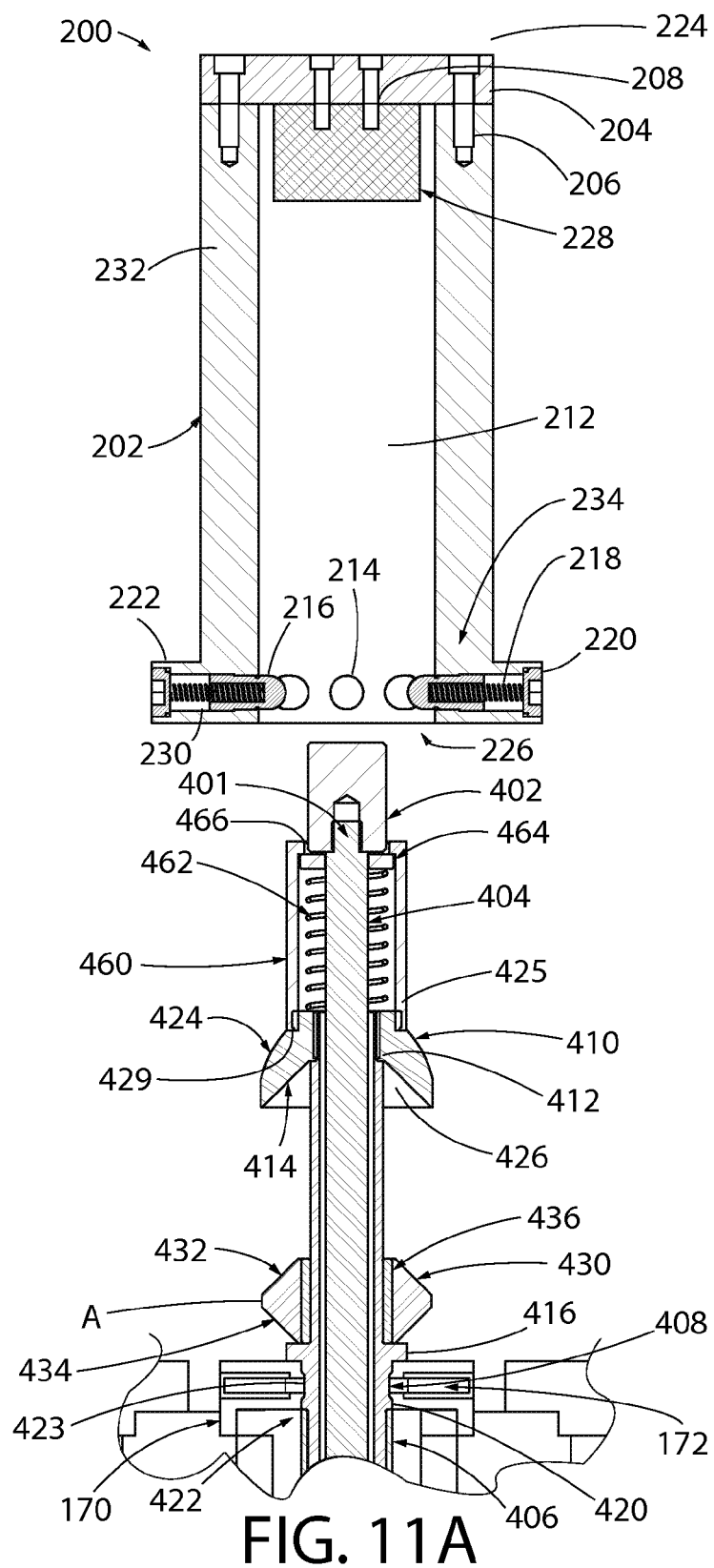
FIG. 11A is a side cross-sectional view of the top end of the drive rod extension and drive rod extension grapple assembly in an uncoupled position.

An axial portion of lifting head sleeve 408 disposed between stop flange 416 and stepped portion 420 defines a recessed annular seating surface 423 configured to removably receive and engage spring biased retaining pins 172 of retaining collar 170 which is initially positioned around the lifting head sleeve at this location (see also FIGS. 5A and 11A).

With continuing reference to FIGS. 9 and 10, bobbin 430 includes an outward-upward facing angled upper bearing surface 432 and an opposing outward-downward facing angled lower bearing surface 434 which meet at a circumferentially extending apex A. Lower bearing surface 434 is selectively engageable with 216 of drive rod extension grapple assembly (DREGA) 200. Upper bearing surface 432 is selectively engageable with lifting head 410. The functionality of these bearing surfaces will be further described herein.

Lifting head 410 may be an annular generally inverted cup-shaped member in some embodiments. Lifting head includes an annular outward-upward facing angled upper bearing surface 424 and opposing annular inward-downward facing angled lower bearing surface 414. Bearing surface 414 defines a downwardly open cavity 426 which is configured to receive and complement the configuration of bobbin upper bearing surface 432. A portion of lower bearing surface 414 is engaged by top end 412 of lifting head sleeve 408 to maintain the axial position of the lifting head 410. Lifting head 410 has a larger diameter than the top end 412 of lifting head sleeve 408.

DRE 400 may further include a drive extension spring 462 having a bottom end engaging a top surface 427 of lifting head 410. Spring 462 is arranged concentrically around actuator shaft 404 and may be a helical coil spring in some embodiments. In one embodiment, a hollow and cylindrically-shaped spring retainer 460 may be provided which holds spring 462 therein. Spring retainer 460 may have an open bottom and a partially open top defining a central opening 466. A top end of spring 462 may engage the underside of a spring spacer 464 disposed inside the spring retainer beneath central top opening 466 configured to receive magnetic block 402 at least partially therethrough (see, e.g. FIGS. 15 and 16). The spring spacer 464 may be generally shaped as a washer having a diameter larger than the diameter of central opening 466 to prevent the drive extension spring 462 from being ejected out the top of the spring retainer 460. The bottom of magnetic block 402 may bear against the top side of spring spacer 464 in some positions. Lifting head 410 may further include a stepped portion 425 formed in the top surface 427 and/or upper bearing surface 424 which engages a bottom annular edge 429 of spring retainer 460 for locating the spring retainer on the lifting head. In one embodiment, as shown in FIGS. 9 and 10, lifting head 410 and spring retainer 460 may be disposed in the general proximity of top end 401 of actuator shaft 404 spaced axially downwards from the top end.

With continuing reference to FIGS. 9 and 10, the lower portion of the drive rod extension (DRE) 400 includes an adapter sleeve 440 having a bottom end 444 and a top end 442 attached to the bottom end 428 of the actuator tube 406. Adapter sleeve 440 has a hollow cylindrical body which slidably receives actuator shaft 404 therein. In one embodiment, the bottom end 428 of the adapter sleeve 440 may be open. Actuator cap 454 may be inserted through the open bottom end 428 of adapter sleeve 440 to threadably engage bottom end 403 of actuator shaft 404 via a fastener.

Adapter sleeve 440 includes an RCCA locking mechanism configured for releasably coupling the sleeve to the rod cluster control assembly (RCCA) 500. In one embodiment, the locking mechanism may be a locking element assembly 450 comprised of a plurality of circumferentially spaced apart and radially moveable locking elements. The locking elements in one exemplary configuration may be locking balls 452 which may be retained on an outer surface of the adapter sleeve 440 by ball retaining plates 451 spaced circumferentially about the sleeve. The locking balls 452 are engageable with an annular machined groove 510 formed on an inside surface of a tubular mounting extension 506 rising upwards from a hub 508 of the RCCA 500 (see, e.g. FIG. 11B). The locking balls 452 are actuated by the actuator cap 454, as further described herein.

When the drive rod extension (DRE) 400 is mounted in the reactor vessel 110, the adapter sleeves 440 of each DRE are located proximate to the bottom ends of lower guide tubes 162 in the drive rod extension support structure (DRESS) 160. This positions the adapter sleeve 440 to releasably engage the rod cluster control assembly (RCCA) 500 via the locking ball assembly 450. The locking ball assembly 450 is operable to couple and uncouple the RCCA 500 from the DRE 400, as further described herein.

Figure 11B:
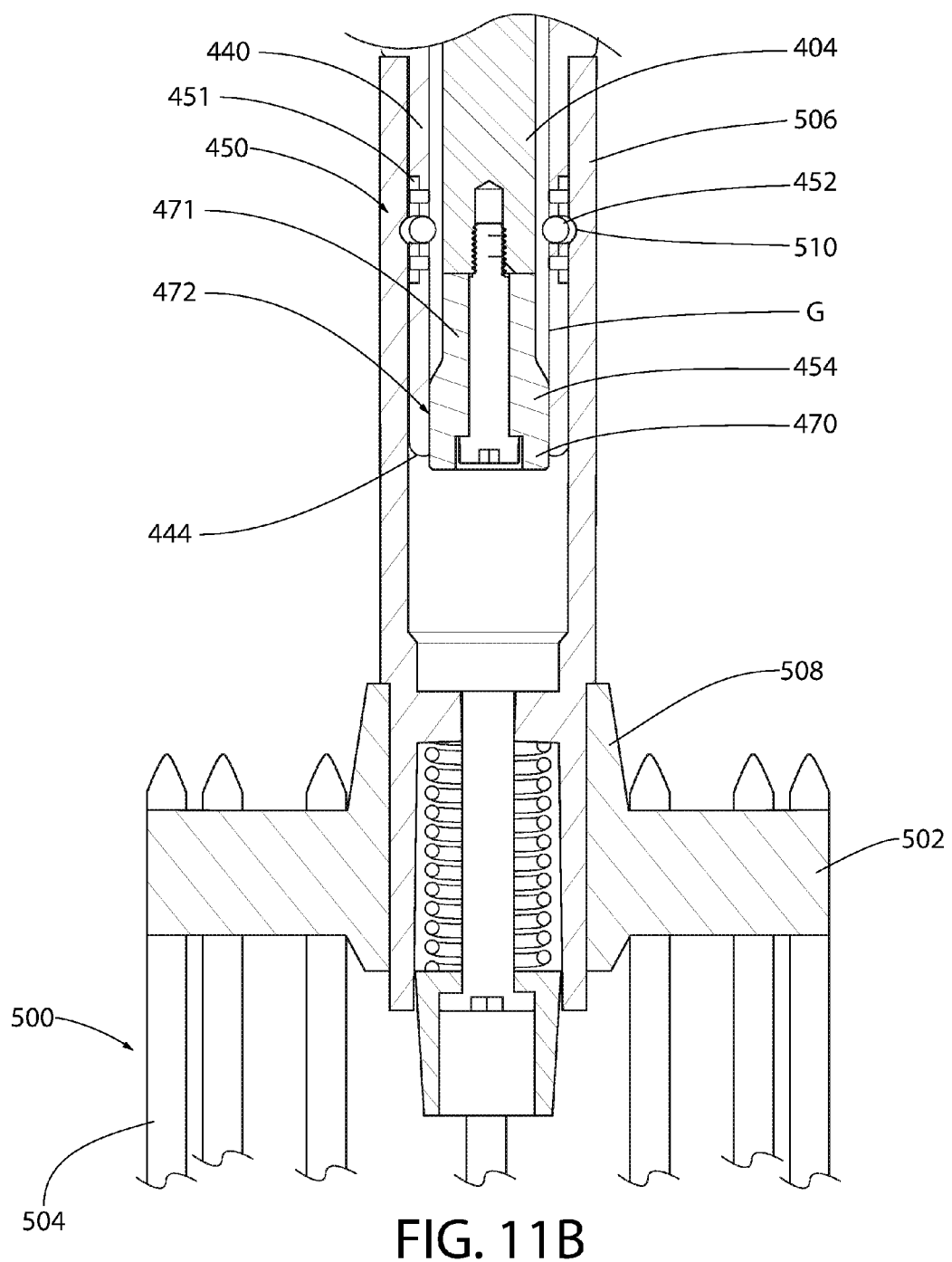
FIG. 11B is a side cross-sectional view of the bottom end of the drive rod extension and rod cluster control assembly in an uncoupled position corresponding to the position of the grapple assembly shown in FIG. 11A.
Figure 12A:
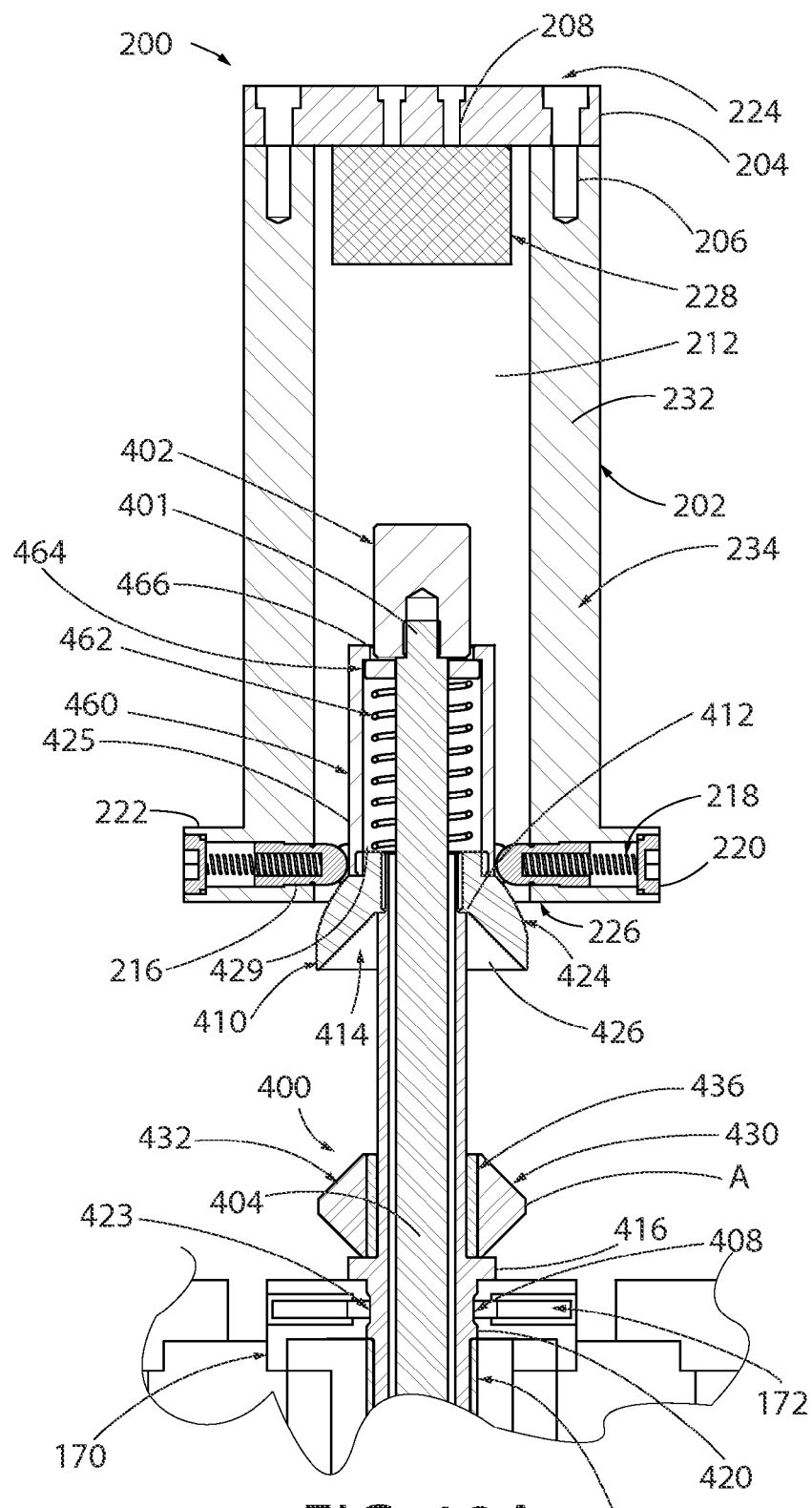
FIGS. 12A and 12B are sequential side cross-sectional views of the top end of the drive rod extension and drive rod extension grapple assembly during the drive rod extension and drive rod extension grapple assembly coupling process.
Figure 12B:
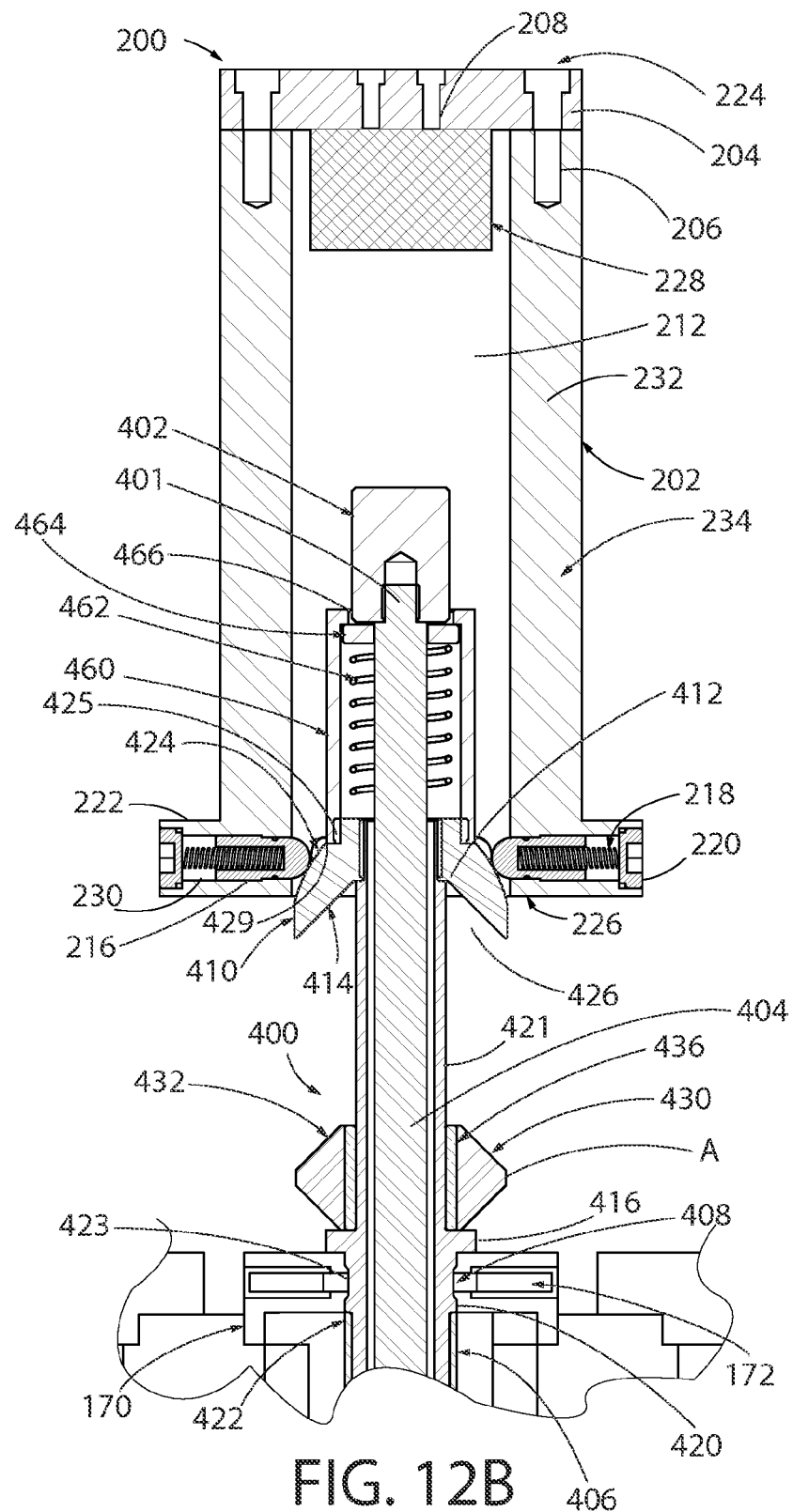

The fuel core 116 is located at the bottom of the reactor vessel 110 supported inside the core support structure 115, such as riser pipe 119. On top of the fuel core 116 is the drive rod extension support structure (DRESS) 160. The DRESS 160 is oriented such that each guide tube is axially and vertically centered above a RCCA 500 installed in the fuel core 116. The drive rod extensions (DRE) 130 are each positioned in the DRESS 160 and the lower portion of each DRE is seated in and loosely engaged with an RCCA 500, although not yet locked in place during initial assembly as evidenced in FIG. 11B showing the actuator cap 454 positioned below the locking ball assembly 450 near the bottom of the adapter sleeve 440.

Control Rod Drive System Operation

An exemplary method for coupling a control rod drive mechanism (CRDM) 300 to a rod cluster control assembly (RCCA) 500 will now be described with various reference to FIGS. 11-17 showing sequential steps in the method or process. The drive rod extension support structure (DRESS) 160 is not shown in these figures for clarity. In one embodiment, as described in greater detail below, the method may be generally accomplished by first coupling the drive rod 130 to the top of the drive rod extension (DRE) 400 which will enable the DRE to then be finally coupled to the RCCA 500. It should be noted that the following process addresses the coupling of a single CRDM 300 to a RCCA 500. This same process, however, may be repeated for making the other CRDM-RCCA couplings for embodiments of control rod drive system (CRDS) 100 in which multiple RCCAs are each individually controlled by a separate dedicated CRDM.

The reactor vessel 110 is initially provided with the drive rod extension support structure (DRESS) 160 installed above the fuel core 116 in the core support structure 115, in this embodiment tubular riser pipe 119. DRE 400 is preliminarily installed and inserted in the drive rod extension support structure (DRESS) 160. The DRE 400 is positioned within the upper and lower guide tubes 161, 162. At this juncture, however, the DRE 400 is initially not operably coupled to either the RCCA 500 or the drive rod assembly (i.e. drive rod extension grapple assembly (DREGA) 200 attached to drive rod 130).

As shown in FIG. 11A, the drive rod extension (DRE) 400 is in an initial or starting vertical axial position with the top end of the actuator shaft 404, lifting head 410, and bobbin 430 exposed and extending above retaining collar 170 of the drive rod extension support structure (DRESS) 160. The makes the upper portion of DRE 400 accessible to the drive rod extension grapple assembly 200 below the top head 113 of the reactor vessel 110. In this initial position of DRE400, the flange 416 of lifting head sleeve 408 may be engaged with the retaining collar 170 and the lifting head sleeve is engaged with the radially biased retaining pins 172 of the collar.

At the bottom end of the DRE 400, the adapter sleeve 440 is positioned and inserted into, but not lockingly engaged with the tubular mounting extension of the rod cluster control assembly (RCCA) 500. Accordingly, at this initial starting position, the RCCA 500 cannot be operably raised or lowered by CRDM 300 because the RCCA has not yet been operably coupled and locked to the DRE 400.

To engage the DRE 400 with the RCCA 500 at the fuel core 116, the DREGA 200 is first connected to the DRE in the overall coupling process. The DREGA 200 and drive rod 130 are axially (vertically) aligned with but spaced apart from top end 401 of DRE 400 (see FIG. 11A). The CRDM 300 is operated to lower the drive rod 130 with DREGA 200 attached thereto towards the top end 401 of DRE 400. As the DREGA 200 is lowered onto the DRE 400, the lifting pins 216 initially in a fully extended position engage angled upper bearing surface 424 of lifting head 410 (see FIGS. 4, 10, and 12A). The lifting pins 216 and lift springs 218 gradually retract farther and farther into the DREGA housing 222 on the grapple body 202 as DREGA 200 continues to be lowered and pushed over the lifting head 410 of DRE 400. The lifting pins 216 slidingly engage the upper bearing surface 424 moving from top to bottom of the lifting head 410 (see FIG. 12B). The lift springs 218 become compressed by the retracting motion of the lifting pins 216.

Figure 13:
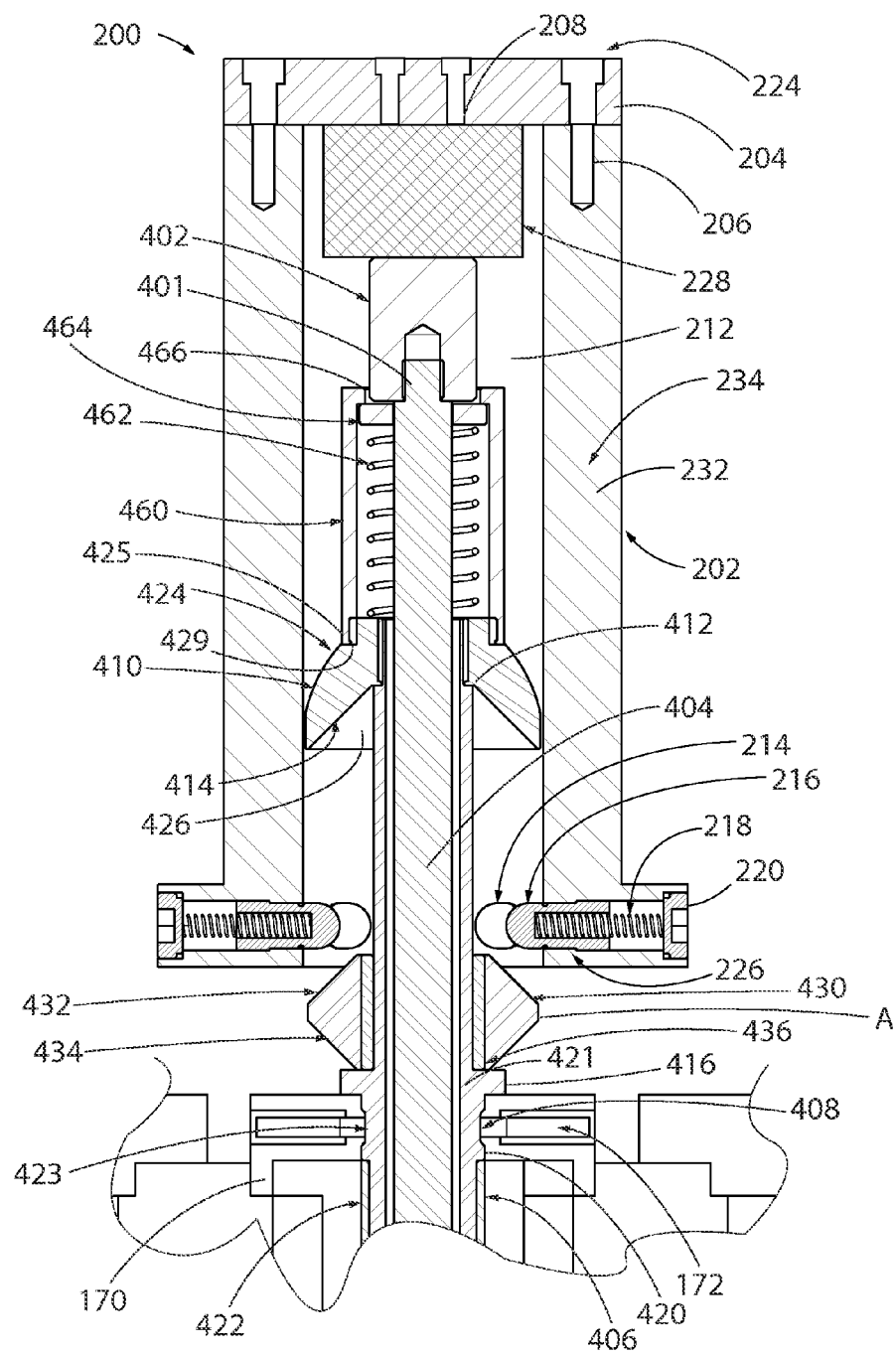
FIG. 13 is a side cross-sectional view of the top end of the drive rod extension and drive rod extension grapple assembly in a coupled position.

When the lifting pins 216 clear and reach a position just beneath the lifting head 410, the pins return to their original fully extended positions inside DREGA interior chamber 212 under the inwards biasing force of the lift springs 218 (i.e. lifting pins are in a position slightly above that shown in FIG. 13). The DREGA 200 is now attached to the DRE 400 and lifting pins 216 are positioned above the bobbin 430 as shown. It should be noted that DREGA 200 cannot be disengaged from DRE 400 at this point with the lifting pins 216 in this axial position by merely raising the drive rod and DREGA with the CRDM 300.

Accordingly, the method carries on by continuing to lower the DREGA 200 until the electromagnet 228 in the DREGA comes into complete physical contact with the magnetic block 402 fastened to the top end 401 of the DRE actuator shaft 404, as shown in FIG. 13. The electromagnet 228 is then activated (energized) from a power source. Activation of the electromagnet 228 causes the magnetic block 402 to be releasably coupled to the electromagnet. After this magnetic coupling is completed, the DREGA 200 and drive rod 130 assembly is now fully connected to the DRE 400 such that raising and lowering the drive rod using CRDM 300 concomitantly raises and lowers the actuator shaft 404 of the DRE as long as the electromagnet 228 remains energized.

In the foregoing position shown in FIG. 13, it should be noted that drive extension spring 462 is uncompressed. The bottom of the magnetic block 402 is positioned proximate to and may be in contact with the top of the spring retainer 460.

In order to attach the RCCA 500 remotely situated at the top of the fuel core 116 from the CRDM 300 to the DRE 400, the actuator shaft 404 in one embodiment needs to be pulled up to force the locking balls 452 radially outwards through the adapter sleeve 440 and into the machined groove 510 located in the RCCA which engages the actuator shaft with the RCCA to complete the coupling at the bottom of the DRE. At this point in the installation process, the lifting head sleeve 408 of DRE 400 is still in its initial axial starting position shown similarly in FIGS. 11A and 13, but with the DREGA 200 magnetically coupled to the DRE as shown in FIG. 13. The uncoupled DRE 400 and RCCA 500 are in their respective lowermost initial positions and at the bottom of their vertical range of travel in the reactor vessel 110 and DRESS 160. The control rods 504 are fully inserted in the fuel core 116. The lifting head sleeve 408 remains as yet engaged with the retaining pins 172 in retaining collar 170. With additional reference to FIG. 10A, the recessed annular seating surface 423 of lifting head sleeve 408 is engaged with the spring biased retaining pins 172 of retaining collar 170 which serve to releasably hold the sleeve 408 in position during coupling of the DREGA 200 to the DRE 400. As a point of reference, it may be noted that the lifting head sleeve stop flange 416 may still rest on the top of retaining collar 170 at present (see, e.g. FIG. 13) which prevents the lifting head sleeve 408 from dropping any lower into the upper guide tube 161 of the DRESS 160.

Figure 14A:
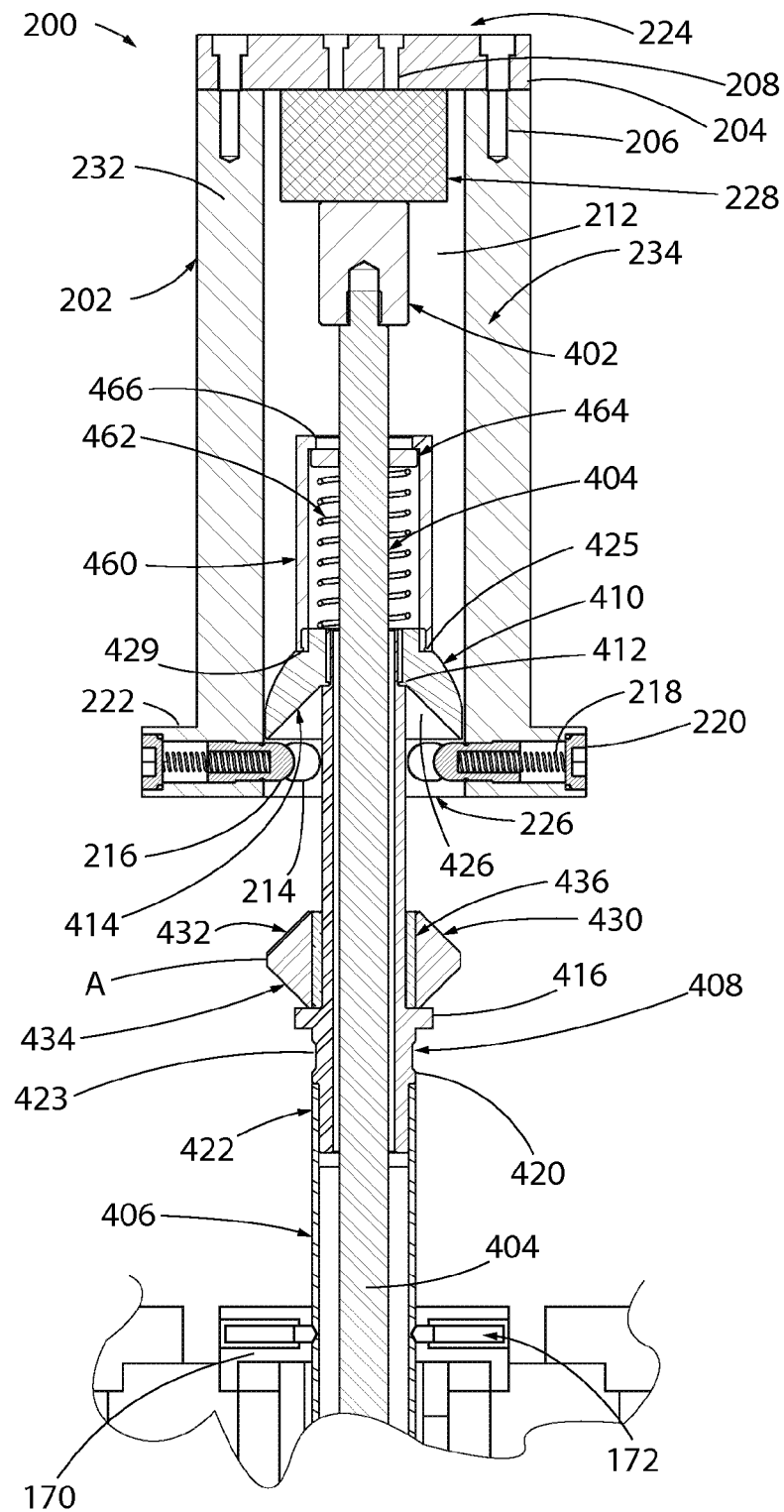
FIG. 14A is a side cross-sectional view of the top end of the drive rod extension and drive rod extension grapple assembly in a higher coupled position than FIG. 13 showing a lifting head sleeve of the drive rod extension disengaged from a retaining collar in the drive rod extension support structure.
Figure 14B:
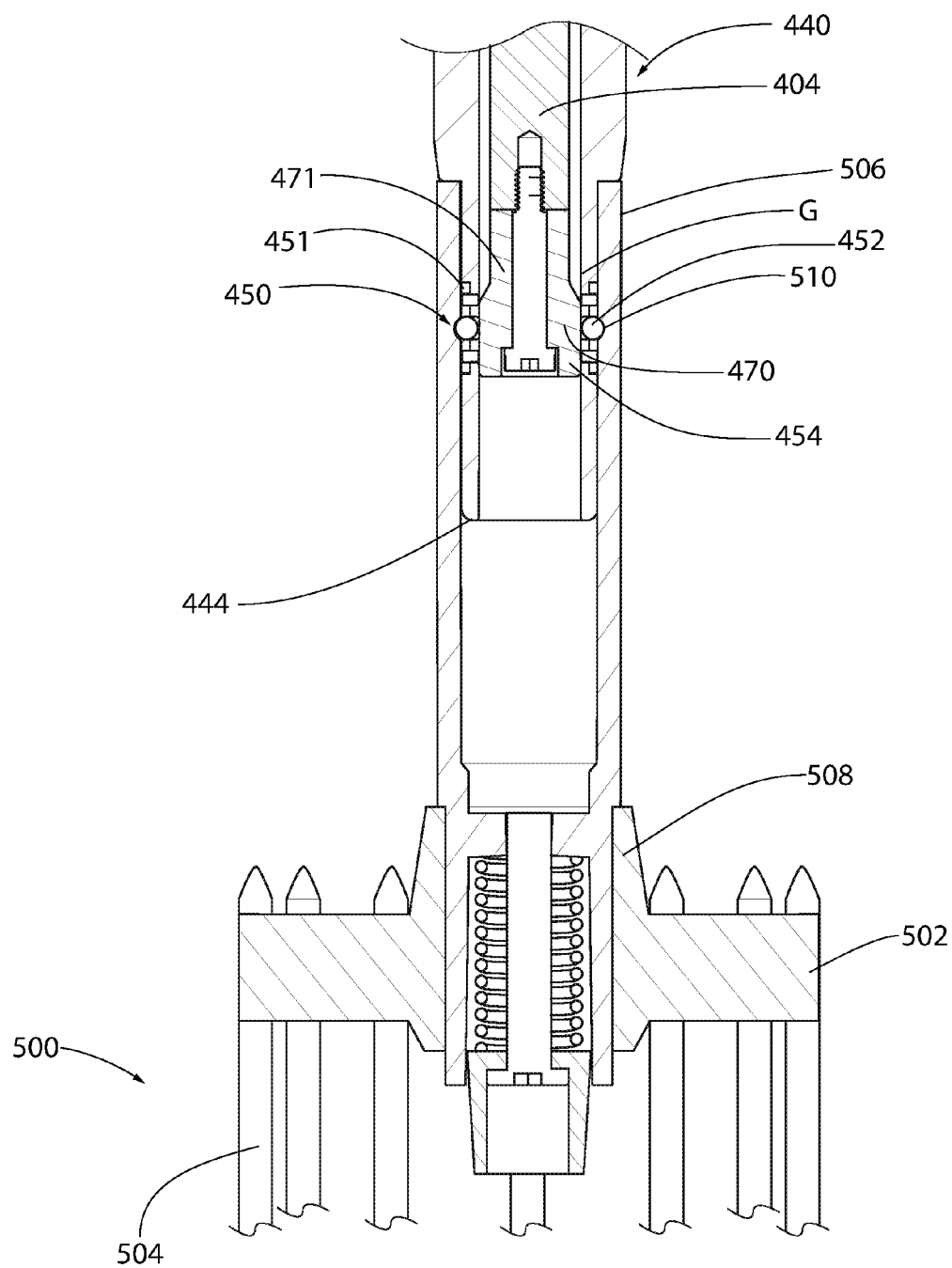
FIG. 14B is a side cross-sectional view of the bottom end of the drive rod extension and rod cluster control assembly in a fully coupled and locked position.

With the DRE 400 in the position of FIG. 13 and the foregoing magnetic coupling completed of the DREGA 200 with the DRE, the DREGA is then next raised upwards by a first vertical distance (via the drive rod 130 using CRDM 300) which pulls and slides the actuator shaft 404 upwards inside the adapter sleeve 440 which remains stationary. The actuator cap 454 mounted to the bottom of the actuator shaft 404 moves axially upwards with the shaft from an unlocked position (shown, e.g. in FIG. 11B) to a locked position (shown, e.g. in FIG. 14B) forcing the locking balls 452 radially outwards from the adapter sleeve 440 to engage the machined groove 510 inside RCCA 500. As shown in FIG. 14B, the DRE 400 is now fully but releasably coupled at the bottom to RCCA 500 which can be raised or lowered by the CRDM 300 via the DRE 400. Accordingly, the CRDM 300 has now been linked to the RCCA 500 for controlling the insertion depth of the control rods 504 into the fuel core 116 for controlling the reactivity.

It should be noted that in the unlocked position of actuator cap 454 (see, e.g. FIG. 11B, 15B, or 16B), the larger diameter lower actuating portion 470 of the cap with annular bearing surface 472 does not contact the locking balls 452 which remain seated but relatively loose in the ball retaining plate 451. This does not create positive locking engagement of the locking balls 452 with the machined groove 510 on the inside of the tubular mounting extension 506 of RCCA 500 sufficient to couple the DRE 400 to the RCCA. The reduced diameter upper portion 471 of actuator cap 454 even when positioned adjacent to the locking balls 452 (see, e.g. FIG. 10B) leaves an annular gap G between the cap and adapter sleeve 440 so the locking balls 452 remain loose and not positively engaged with the machined groove 510 of the RCCA 500.

In the locked position of the actuator cap 454 (see, e.g. FIG. 14B), the annular bearing surface 472 of the larger diameter lower actuating portion 470 of the cap is adjacent to and contacts locking balls 452. Since there is no appreciable annular gap or space between the lower portion 470 of actuator cap 454 and adapter sleeve 440, the annular bearing surface 472 drives the locking balls 452 outwards to engage machined groove 510 of the RCCA tubular mounting extension 506 which positively couples the DRE 400 to the RCCA 500. In one embodiment, a sloping transition 475 (see, e.g. FIG. 16B) may be formed between the larger diameter lower portion 470 and reduced diameter upper portion 471 of the actuator cap 454 to provide smooth sliding operation and engagement of the lower portion 470 with the locking balls 452.

After the RCCA 500 has been coupled to the CRDM 300 in the foregoing manner, the RCCA remains in its bottom and lowermost position within the lower guide tubes 162 proximate to the top of the fuel core 116. To provide the ability to operationally retract the control rods 504 from the fuel core 116, the DREGA 200 is slightly raised further upwards if necessary via the CRDM 300 until the lifting pins 216 engage the bottom of lifting head 410 (as shown in FIG. 14A) if not already engaged by the DREGA-RCCA coupling process). Until the lifting pins 216 engage the underside of lifting head 410, this initial limited upward range of travel raises the actuator shaft 404 and DREGA 200, but not the lifting head sleeve 408 which remains engaged with retaining collar 170 and retaining pins 172.

DREGA 200 is then further raised through a second upward vertical distance and range of travel which pulls both the actuator shaft 404 (via the magnetic coupling with the DREGA) and lifting head 410 with lifting head sleeve 408 fixed thereto upwards together simultaneously. This action disengages the lifting head sleeve 408 from the retaining pins 172 in retaining collar 170 as also shown in FIG. 14A. The DRE 400 (including actuator shaft 404, lifting head sleeve, actuator tube 406, and adapter sleeve 440 shown in FIGS. 10A and 10B) and the RCCA 500 coupled thereto may now be freely raised as a unit to a maximum height within the reactor vessel 110 representing the fullest retracted position of the control rods 504 from the fuel core 116 during normal operation of the reactor vessel 110. The actuator shaft 404 and lifting head sleeve 408 may further be alternatingly lowered and then raised again through a plurality of possible axial positions via operation of the CRDM 300 and drive rod 130.

It may be noted that the RCCA 500 fits inside and slides axially upward and downward within the confines of the lower guide tubes 162 of the DRESS 160 which have a diameter selected to fully receive the RCCA therein in one embodiment. The length of the lower guide tubes 162 establishes the maximum vertical range of travel of the RCCA 500 and correspondingly the control rods 504 mounted thereto.

Figure 15A:
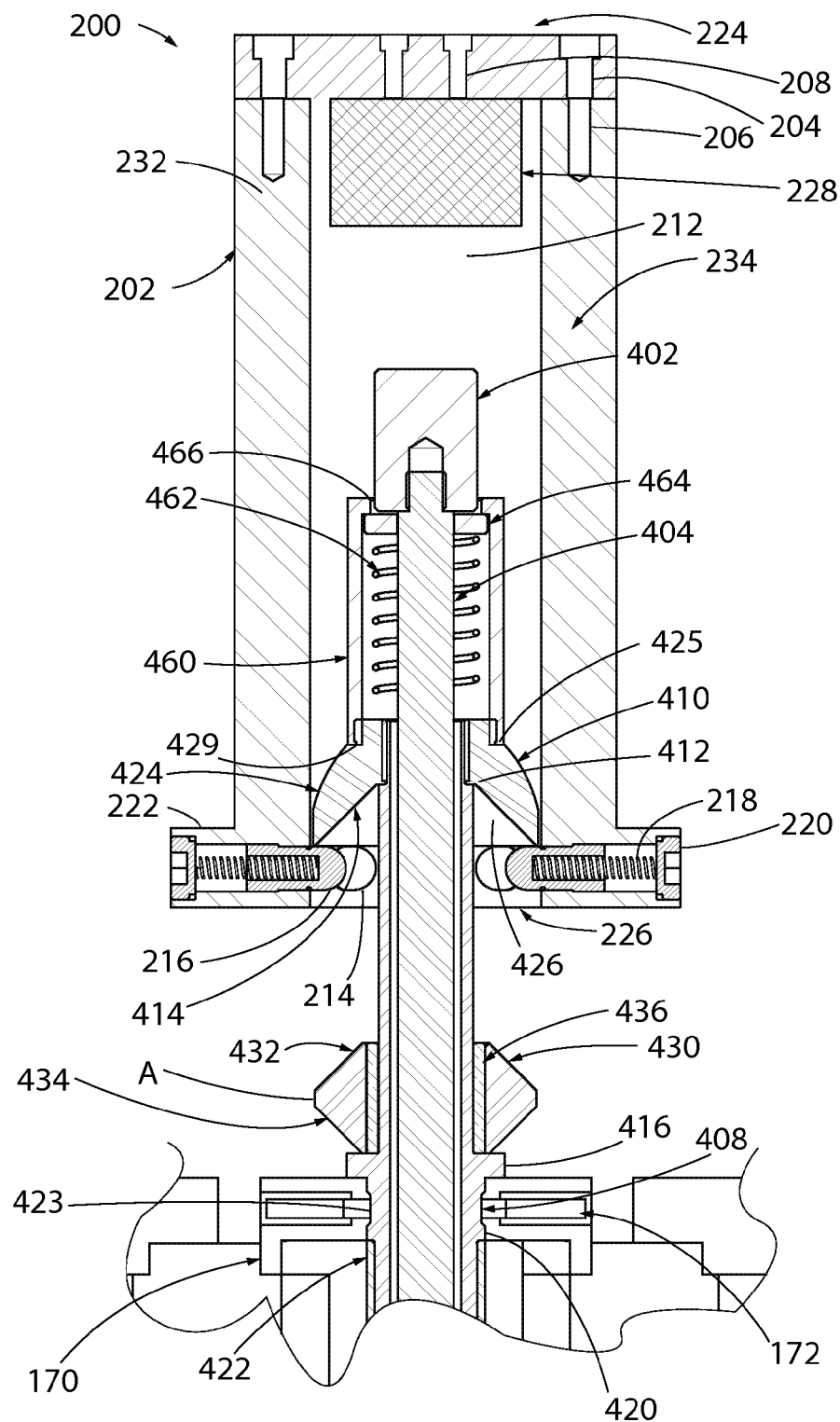
FIG. 15A is a side cross-sectional view of the top end of the drive rod extension and drive rod extension grapple assembly shown in an uncoupled position.
Figure 15B:
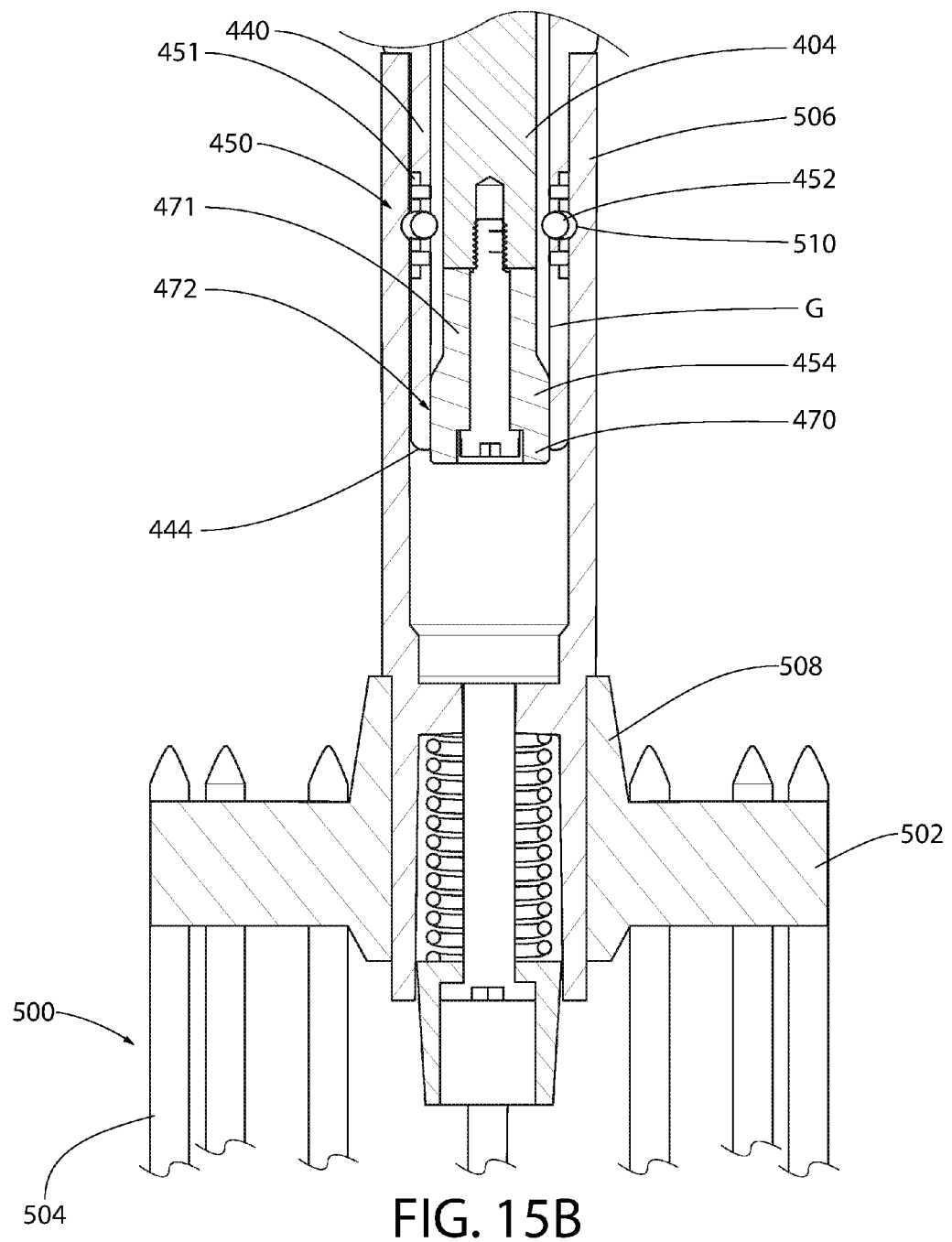
FIG. 15B is a side cross-sectional view of the bottom end of the drive rod extension and rod cluster control assembly in an uncoupled and unlocked position corresponding to the position of the grapple assembly shown in FIG. 15A.

A method to detach the rod cluster control assembly (RCCA) 500 from the drive rod extension (DRE) 400 and CRDM 300 for SCRAM events or other purposes such as opening the reactor vessel head will now be described. In one embodiment, the electromagnet 228 is first de-activated. This allows the actuator shaft 404 to fall or drop by a preset distance determined by the drive extension spring 462 and the spring spacer 464. Doing so permits the locking balls 452 to fall into the gap G created by the reduced diameter upper portion 471 of the actuator cap 454. The RCCA 500 is now disengaged from the actuator shaft 404 of drive rod extension (DRE) 400 and the CRDM 300. The foregoing falling action of the actuator shaft 404 also re-engages the lifting head sleeve 408 with the retaining pins 172 in retaining collar 170 of the DRESS 160 (see FIG. 15A). It should be noted that this uncoupling action ensures that the control rods attached to the RCCA 500 remain fully inserted into the fuel core 116 which shuts down the nuclear reaction. FIGS. 14 and 15 illustrate this foregoing uncoupling sequence.

When in the foregoing position, it should be noted that the DRE 400 can also be completely removed from the drive rod extension support structure (DRESS) 160 if desired by simply lifting the drive rod extension grapple assembly (DREGA) 200 via the control rod drive mechanism (CRDM) 300. Because the electromagnet 228 has been de-energized, this lifting action will disengage the lifting head sleeve 408 from the retaining pins 172 in retaining collar 170 of the DRESS 160 (see also FIGS. 5A and 11A).

Figure 16A:
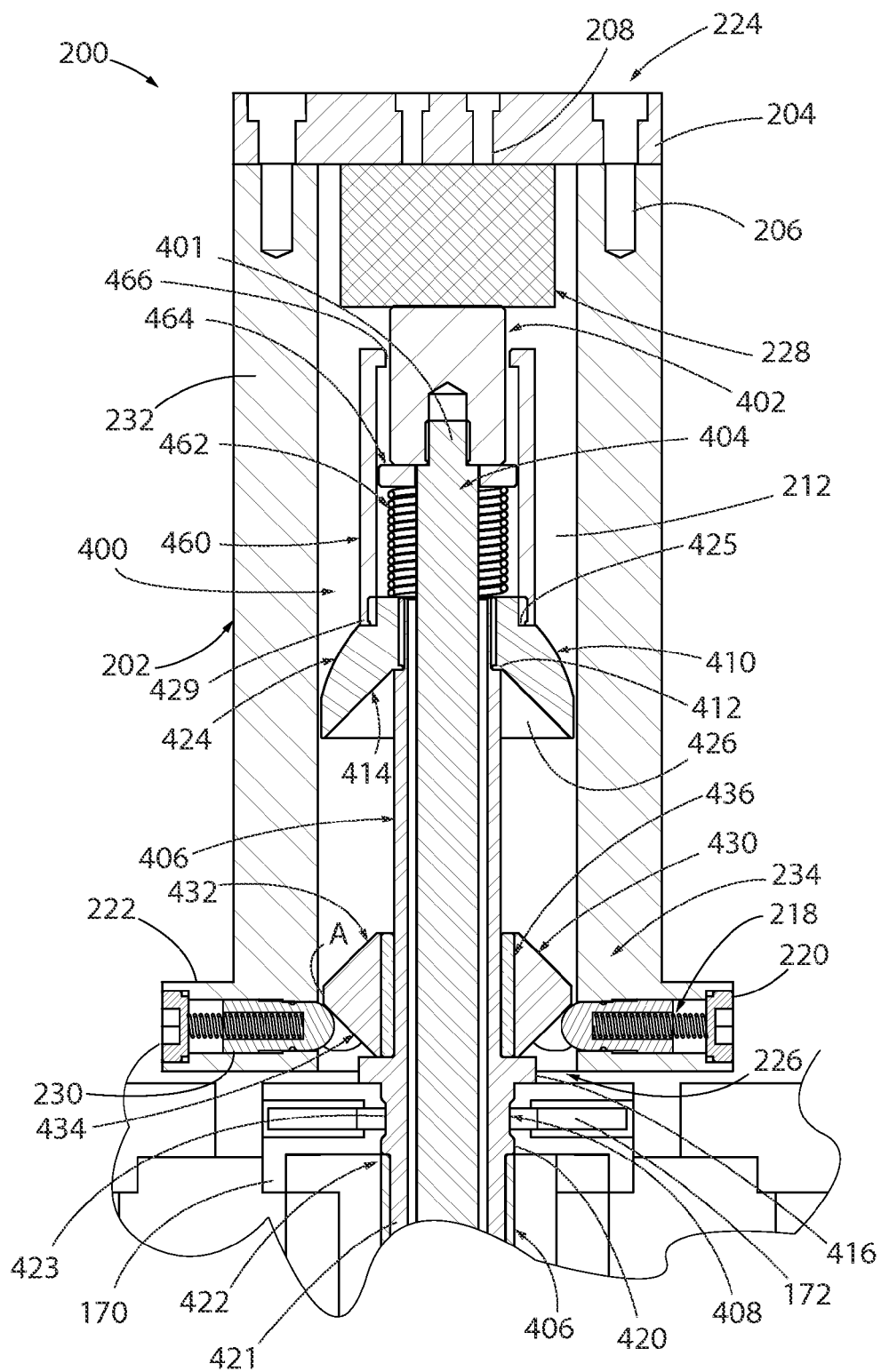
FIG. 16A is a side cross-sectional view of the top end of the drive rod extension and drive rod extension grapple assembly in a coupled position with the grapple assembly in a lowermost position on the drive rod extension.
Figure 16B:
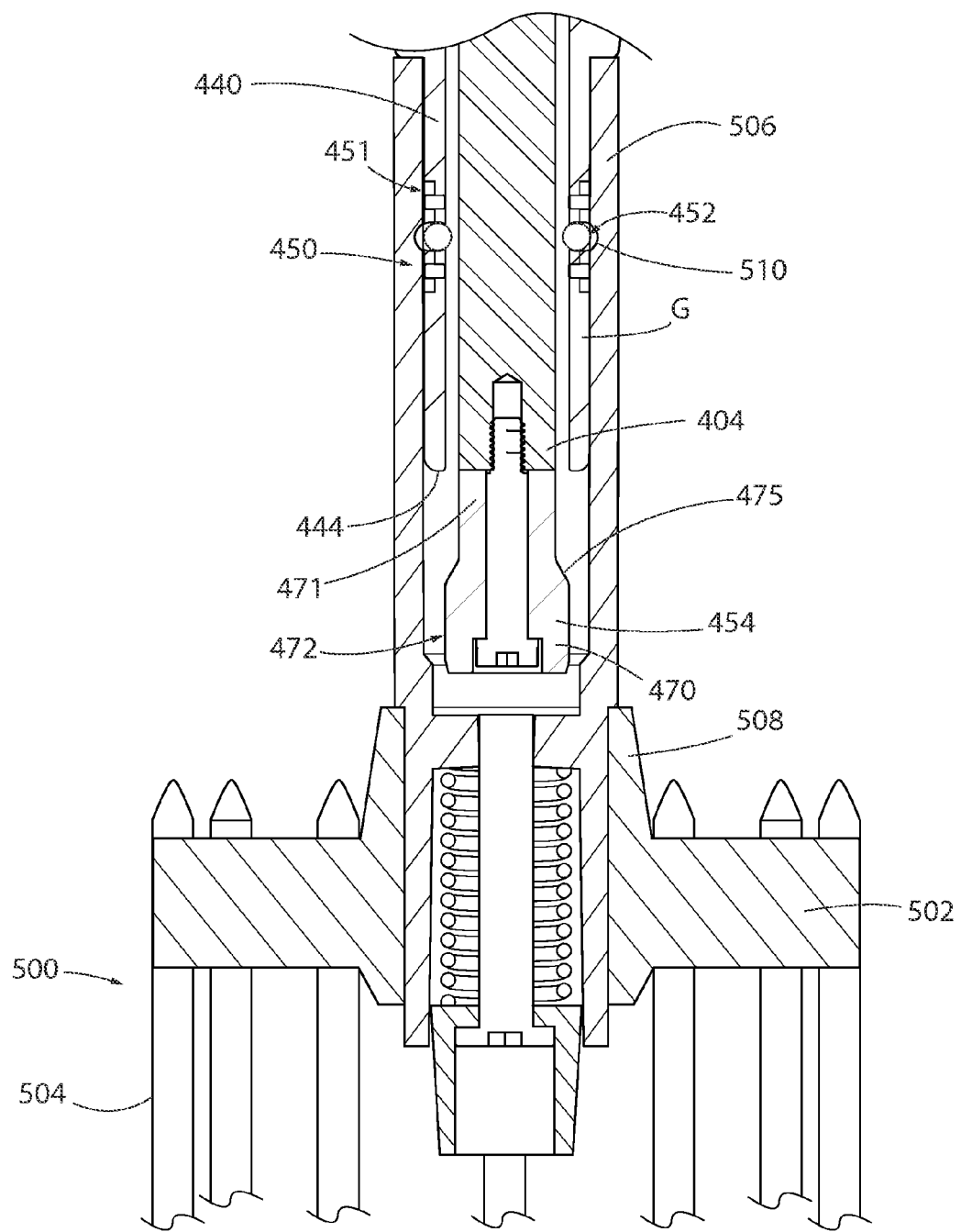
FIG. 16B is a side cross-sectional view of the bottom end of the drive rod extension and rod cluster control assembly with the bottom end of the drive rod extension in a lowermost position in the rod cluster control assembly corresponding to the position of the grapple assembly shown in FIG. 16A.

A method for uncoupling and removing the DREGA 200 from the DRE 400 (remaining in place in DRESS 160) will now be described. First, the electromagnet 228 is deactivated (and the RCCA 500 is unlocked) in the manner already described above and shown in FIGS. 15A and 15B. Next, the DREGA 200 is pushed downwards via the CRDM 300 (and drive rod 130) to engage the bobbin 430. The lifting pins 216 initially engage angled upper bearing surface 432 which increasingly drives the pins radially outwards (i.e. retracted from chamber 212) back into the DREGA 200 as the pins advance downwards along the upper bearing surface. The lifting pins 216 reach a maximum retracted position at the apex A of the bobbin 430, and then increasingly begin projecting back inwards into chamber 212 of DREGA 200 again as the pins travel downwards along the angled lower bearing surface 434 (see FIG. 16A). Eventually, the lifting pins 216 become fully extended beneath the bobbin 430 immediately above stop flange 416 on lifting head sleeve 408. The downward movement of DREGA 200 simultaneously compresses drive extension spring 462 as shown in FIG. 16A which allows the positioning of lifting pins 216 below bobbin 430 to occur. Note that a portion of magnetic block 402 has passed through the central opening 466 and entered spring retainer 460 to compress the spring 462.

Figure 17A:
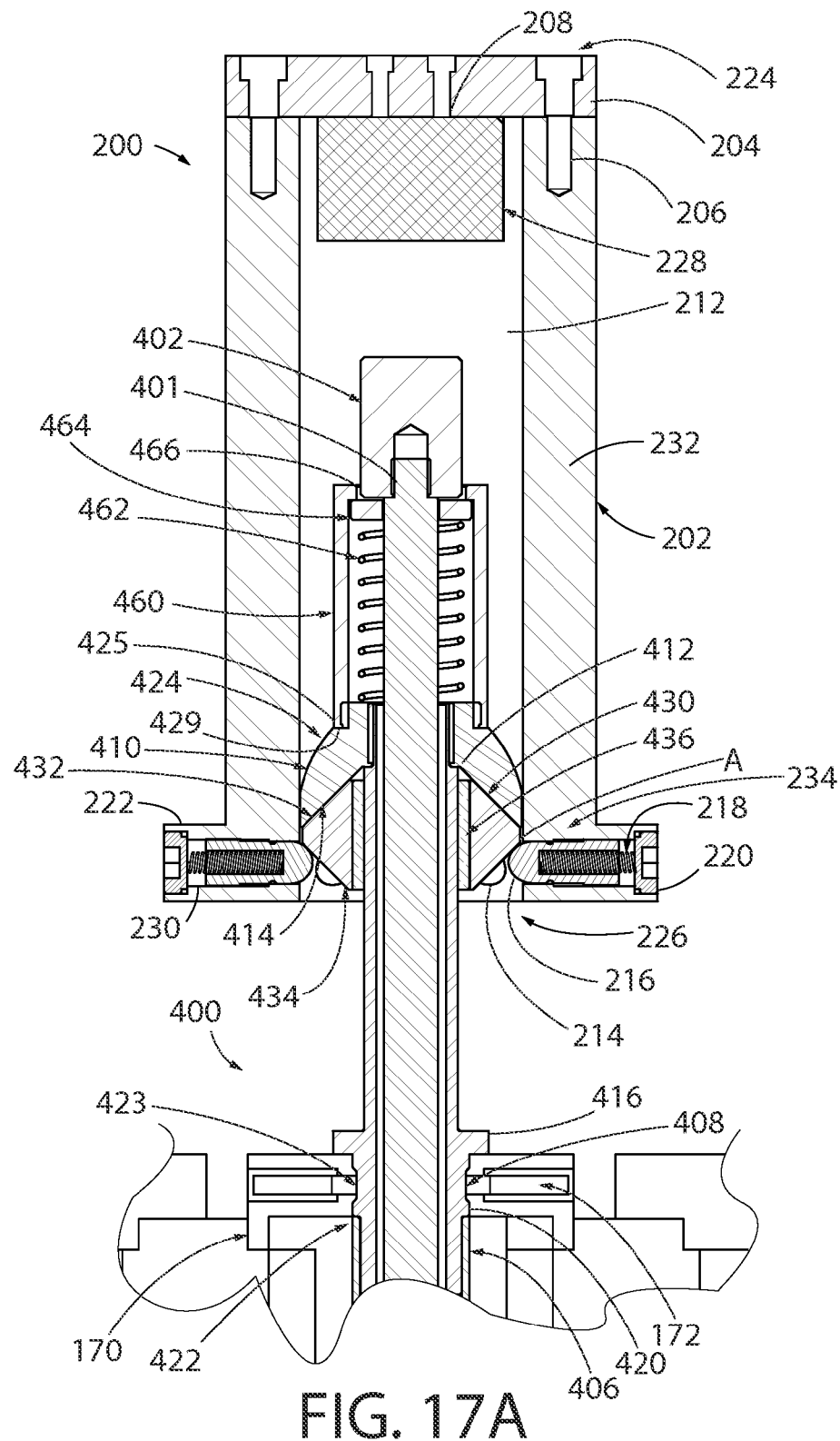
FIGS. 17A-C show sequential steps in a process for uncoupling and dismounting the top end of the drive rod extension from the drive rod extension grapple assembly.
Figure 17B:
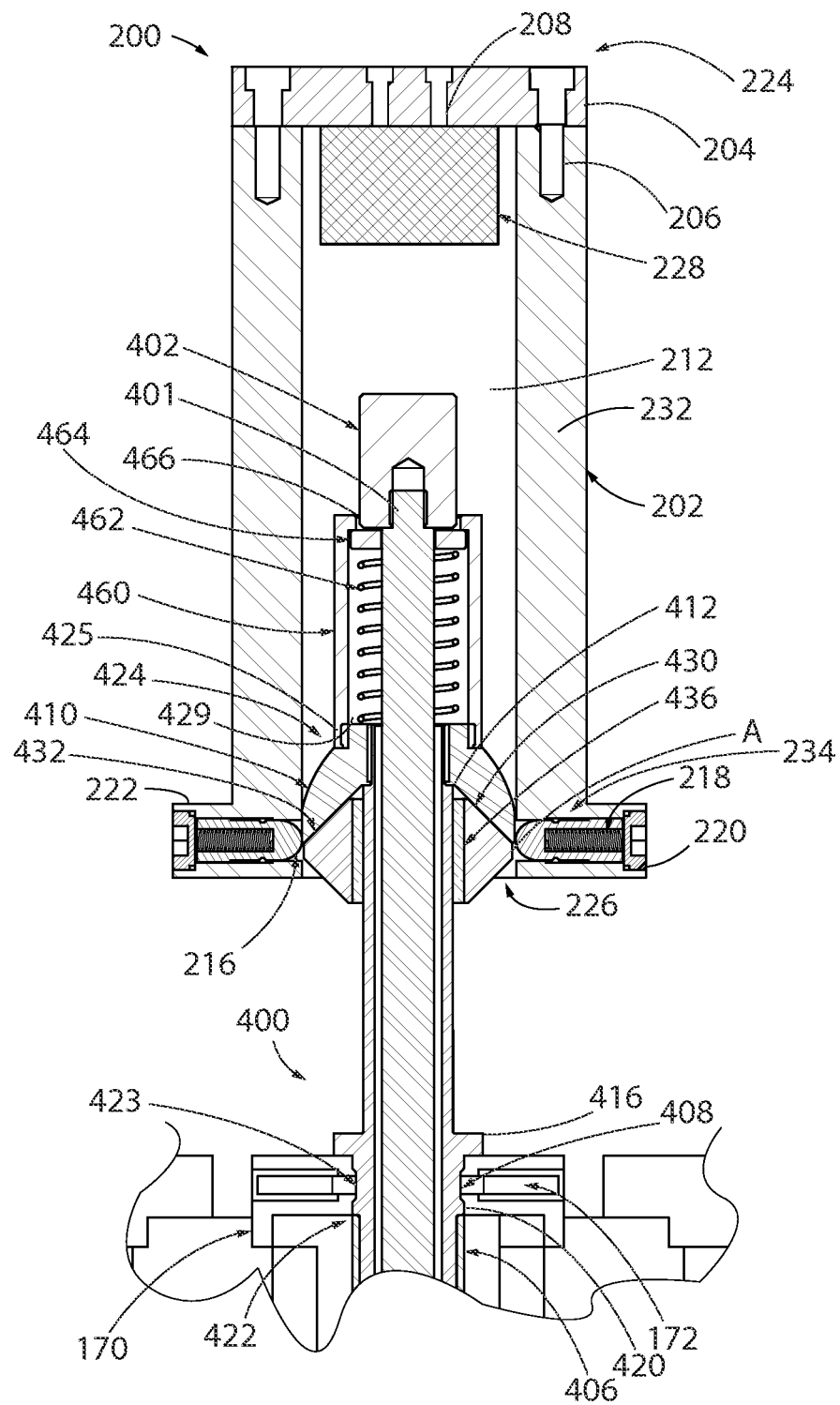
Figure 17C:
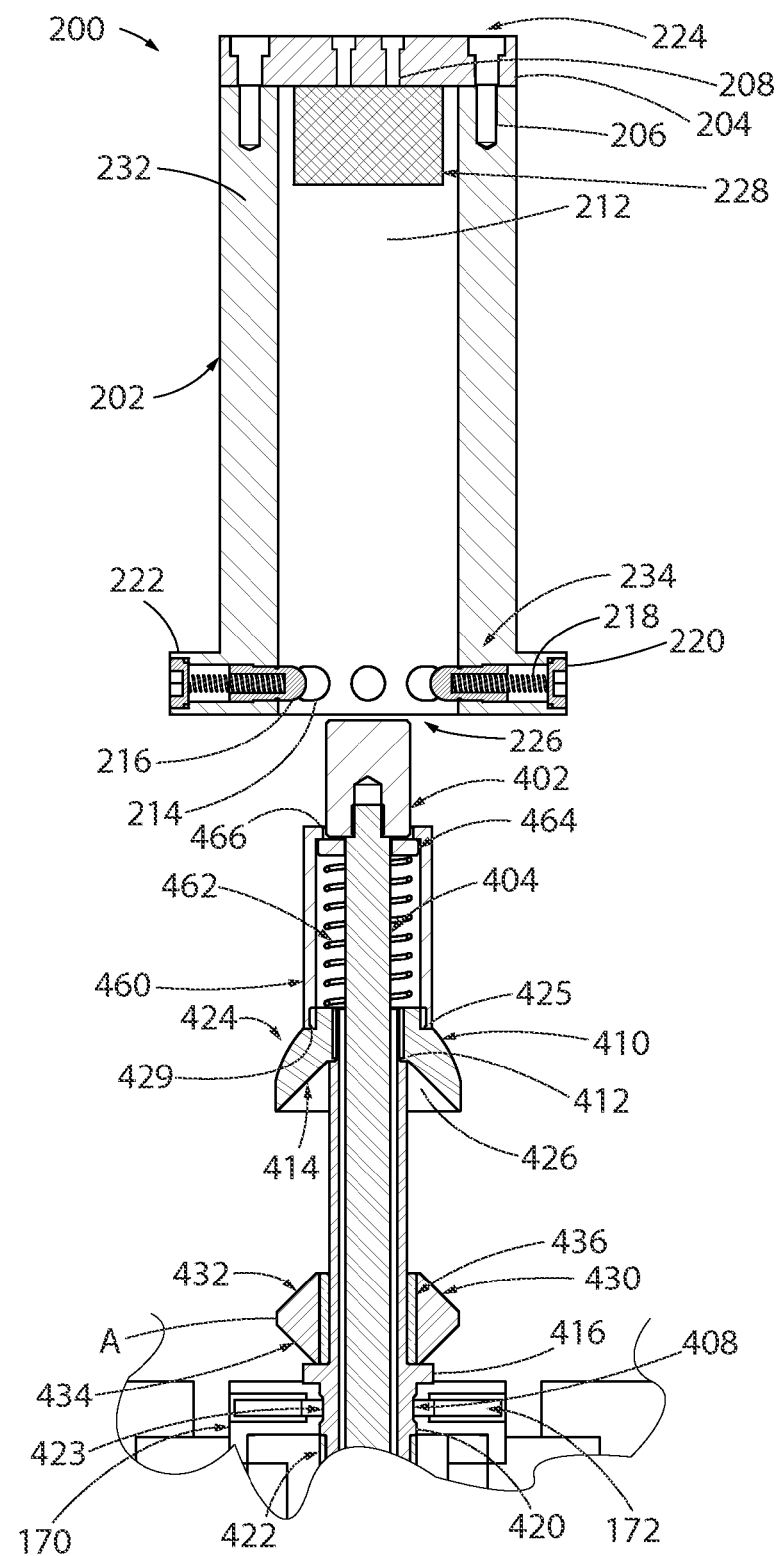

To complete the uncoupling of DREGA 200 from the DRE 400, the DREGA is then raised concomitantly lifting the bobbin 430 with it via the lifting pins 216 into the lifting head 410 until the bobbin cannot move any higher, as shown in FIG. 17A. This occurs when the angled upper bearing surface 432 of bobbin 430 enters cavity 426 and engages complementary configured lower bearing surface 414 of lifting head 410. The bobbin 430 is now nested in lifting head 410. As the DREGA 200 then continues to be raised, the lifting pins 216 will again retract outward back into DREGA housing 222 and ride along the outside of the bobbin (angled lower bearing surface 434) as shown in FIG. 17B. The lifting pins 216 then engage and slide along angled upper bearing surface 424 of lifting head 410 whereon the pins again increasingly begin projecting back inwards into chamber 212 of DREGA 200. Eventually, the lifting pins 216 become fully extended and are free of the lifting head 410 as shown in FIG. 17C. The DREGA 200 is now fully disengaged from the drive rod extension (DRE) 400 which in turn has disengaged the CRDM 300 from the DRE.

A control rod drive system according to the present disclosure provides numerous advantages, including the following.

The length of the CRDM drive rod 130 may be limited to a relatively short length that is easily manufacturable. The shorter length drive rod has the added benefits of ease of maintenance.

There is no risk of the drive rod being damaged during a SCRAM because the drive rod does not fall in a SCRAM event for full insertion of control rods into the fuel core to suppress the nuclear reaction as in prior known designs. In embodiments of the present invention, the control rod assembly (RCCA) 500 holding the control rods is released by uncoupling the RCCA from the drive rod extension (DRE) 400 during a SCRAM. Furthermore, because the drive rod does not fall during a SCRAM, the top nozzle of the fuel assembly is not at risk for being damaged during a SCRAM.

The complex electromechanical components in the CRDM system 100 are not subject to the harsh environment inside of the reactor vessel because the CRDM 300 is mounted external to the reactor vessel.

The redundant rod ejection protection device (REPD) 140 eliminates the potential for the drive rod 130 to be ejected from the reactor vessel due to a CRDM housing failure.

A final advantage is that the CRDS 100 may be designed so that so that the CRDS will always SCRAM under gravity if the power to the CRDM 300 is cut via magnetically uncoupling the DREGA 200 from the DRE 400, as described above.

Unless otherwise specified, the components described herein may generally be formed of a suitable material appropriate for the intended application and service conditions. A suitable metal is generally preferred for the components described herein with exception of the magnetic components. Components exposed to a corrosive or wetted environment may be made of a corrosion resistant metal (e.g. stainless steel, galvanized steel, aluminum, etc.) or coated for corrosion protection.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A control rod drive system for a nuclear reactor vessel, the system comprising:
a vertically oriented drive rod mechanically coupled to a control rod drive mechanism operable to raise and lower the drive rod through a plurality of axial positions;
a rod cluster control assembly comprising a plurality of control rods supported by a common support plate having an upwardly extending mounting tube extension comprising an annular groove, the control rods axially movable as a unit with the support plate and configured for removable insertion into a nuclear fuel core;
a drive rod extension extending axially between the rod cluster control assembly and the drive rod, the drive rod extension having a bottom end releasably coupled to the rod cluster control assembly;
a drive rod extension grapple assembly connected to the drive rod, the grapple assembly releasably coupled to a top end of the drive rod extension, the grapple assembly comprising cylindrical sidewalls defining an interior chamber and a downwardly open bottom leading to the chamber;
the drive rod extension including a longitudinally-extending actuating tube and an actuating shaft slidably disposed in the tube, the actuating shaft extending through a top of the actuating tube and releasably operably coupled to the grapple assembly for upward and downward movement with the drive rod;
an annular adapter sleeve affixed to a bottom end of the actuating tube;
a plurality of circumferentially spaced apart locking balls disposed in the adapter sleeve and radially movable;
an elongated actuator cap affixed to a bottom end of the actuating shaft and axially movable with the actuating shaft upward and downward inside the adapter sleeve, the actuator cap comprising a diametrically enlarged actuating portion defining an annular bearing surface engageable with the locking balls;
wherein the grapple assembly includes a plurality of radially retractable spring-biased lifting pins engageable with the drive rod extension and slideably disposed in the cylindrical sidewalls of the grapple assembly for inward and outward linear movement, and the drive rod extension includes a lifting head configured to engage and retract the lifting pins when the lifting head is inserted into the grapple assembly;
wherein the actuator cap and actuating shaft are axially movable between an unlocked position in which the actuating portion of the actuator cap disengages the locking balls in the adapter sleeve, and a locked position in which the actuating portion engages and forces the locking balls radially outwards to engage the annular groove in the rod cluster control assembly;
wherein raising and lowering the drive rod raises and lowers the rod cluster control assembly.

2. The system of claim 1, wherein the grapple assembly includes an electromagnet which magnetically couples the drive rod extension to the grapple assembly when the electromagnet is energized and uncouples the drive rod extension from the grapple assembly when the electromagnet is de-energized.

3. The system of claim 2, wherein the drive rod extension includes a magnetic block engageable with the electromagnet of the grapple assembly.

4. The system of claim 2, wherein the control rod drive mechanism is configured and operable to maintain the drive rod in axial position when the drive rod extension is uncoupled from the drive rod via de-energizing the electromagnet.

5. The system of claim 2, wherein responsive to a loss of power to the electromagnet, the drive rod extension automatically uncouples from the drive rod extension grapple assembly and drops vertically while the drive rod remains stationary.

6. The system of claim 1, wherein the grapple assembly includes a cylindrically shaped body defining a downwardly open chamber configured to movably receive the top end of the drive rod extension therein.

7. The system of claim 1, wherein the locking balls are radially movable between the locked and unlocked positions by raising or lowering the actuator shaft with the drive rod.

8. The system of claim 1, wherein the control rod drive mechanism is mounted above a top head of the reactor vessel outside the reactor vessel and the grapple assembly is mounted below the top head inside the reactor vessel.

9. The system of claim 8, wherein the control rod drive mechanism is mounted to a flanged nozzle extending upwards from the top head of the reactor vessel.

10. The system of claim 1, wherein the drive rod extension extends axially from a location proximate to the top of a fuel core in the reactor vessel to a location spaced below a top head of the reactor vessel.

11. The system of claim 1, wherein the lifting head comprises an annular inward-downward facing angled lower bearing surface defining a downwardly open cavity configured to receive a mating complementary configured upper bearing surface of a bobbin slidably disposed on the drive rod extension for upward and downward movement thereon, the angled lower bearing surface of the lifting head engageable with the upper bearing surface of the bobbin.

12. The system of claim 11, wherein the bobbin is moveable from an upper position nested in the cavity of the lifting head and a second lower position spaced vertically apart from and below the lifting head.

13. The system of claim 12, wherein the bobbin is insertable into the interior chamber of the grapple assembly.

14. The system of claim 13, wherein the bobbin is configured to engage and radially retract the lifting pins of the grapple assembly when the bobbin is inserted into the interior chamber of the grapple assembly.

15. The system of claim 14, wherein the bobbin when in the upper nested position and engaged with the lifting pins is operable to raise the lifting head via raising the grapple assembly.

* * * * *